US006654135B2

(12) United States Patent
Mitani

(10) Patent No.: US 6,654,135 B2
(45) Date of Patent: *Nov. 25, 2003

(54) PRINTING CONTROL SYSTEM, A PRINT CONTROLLER, AN IMAGE SERVER, AN INFORMATION PROCESSING APPARATUS AND A METHOD THEREFOR, AND A STORAGE MEDIUM STORING A PROGRAM READABLE BY A COMPUTER

(75) Inventor: Shigeyuki Mitani, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,913

(22) Filed: Apr. 23, 1998

(65) Prior Publication Data

US 2003/0184791 A1 Oct. 2, 2003

(30) Foreign Application Priority Data

Apr. 23, 1997 (JP) ............................................ 10-113258
Apr. 25, 1997 (JP) .............................................. 9-109068

(51) Int. Cl.⁷ .............................................. G06F 15/00
(52) U.S. Cl. ...................................... 358/1.15; 358/1.1
(58) Field of Search .......................... 358/1.1, 1.7, 1.4, 358/1.12, 1.13, 1.14, 1.15, 400, 500, 483, 448, 501; 710/20, 21, 100, 131; 711/1, 100, 127; 712/28, 33, 206; 709/220, 227, 200

(56) References Cited

U.S. PATENT DOCUMENTS

| | | | | |
|---|---|---|---|---|
| 5,625,757 A | * | 4/1997 | Kageyama et al. | 358/1.14 |
| 5,815,722 A | * | 9/1998 | Kalwitz et al. | 717/11 |
| 5,995,723 A | * | 11/1999 | Sperry et al. | 358/1.15 |
| 6,018,769 A | * | 1/2000 | Tezuka et al. | 709/220 |
| 6,091,507 A | * | 7/2000 | Vatland et al. | 358/1.15 |
| 6,145,031 A | * | 11/2000 | Mastie et al. | 710/52 |

* cited by examiner

Primary Examiner—Gabriel Garcia
(74) Attorney, Agent, or Firm—Fitzpatrick, Cella, Harper & Scinto

(57) ABSTRACT

A printing control system utilizes the resources of the printer system effectively when the documentary image is printed including images. The format is used, in which image information is managed and controlled in a plurality of resolutions, as well as by a plurality of tile information. Such format is also effectively utilized. To this end, the printing control system includes the image server that supplies and/or controls image information, the print server that controls the output processes, the print controller that controls a plurality of print servers, and also controls the output processes, and the network that connects these constituents. It is made possible to determine the print server that executes the image output on the basis of the designated order of priorities. The image information is transmitted together with the print order, which are synthesized again on the designated print server.

90 Claims, 26 Drawing Sheets

PRINTING CONTROL SYSTEM, A PRINT CONTROLLER, AN IMAGE SERVER, AN INFORMATION PROCESSING APPARATUS AND A METHOD THEREFOR, AND A STORAGE MEDIUM STORING A PROGRAM READABLE BY A COMPUTER

BACKGROUND OF THE INVENTION

1. Field of the Invention

The present invention relates to a printing control system capable of outputting image information through an optimum apparatus using a plurality of output devices, a print controller, an image server, an information processing apparatus and a method therefor. The invention also relates to a storage medium that stores programs.

2. Related Background Art

In accordance with the conventional art, it is possible to request image outputs by sending image data from an operational terminal in a remote location to a specific print server through a net work such as an internet or an intranet.

Also, in a case where a plurality of print servers are provided for a system, it is possible for a designated printer to execute its output when a print server is specified to process such output as requested by way of an operational terminal.

For a conventional art of the kind, there is a need for occupying a transmission channel (net work) in order to transmit all the image data for output when images are requested to be output in a remote location. As a result, the load on the image data transmission becomes heavier, and it takes a time to complete the required image output after all. There is also a problem that the expenditures, such as line fees, required for image data transmission becomes greater, among some others.

Here, although it is conventionally possible to reduce the load given to the transmission channel, as well as the amount of information to be transmitted by dividing the image output information into the image information per se and the other pieces of information for the separate transmissions, any remarkable curtailment is possible for the total amount of information to be transmitted, nor for the related expenditures needed therefor, because there are no essential changes in transmitting the image information that requires a high load over the transmission channel eventually.

Further, with the conventional art, the output is made only form the target output apparatus when requested, irrespective of the status of the output apparatus currently in use. As a result, it is impossible to fully utilize the available resources effectively by the system as a whole.

SUMMARY OF THE INVENTION

In accordance with the present invention, it is made possible to use the image information of the image output information that contains images, which is accumulated in the image server in advance, in order to significantly curtail the amount of transmitting information, as well as the related expenditures.

Also, it is made possible to fully utilize the resources in the system by automatically identifying the print server that executes image output by use of the print controller in accordance with the loading condition of the system as a whole, as well as the quality of output images and the required functions.

Further, it is made possible to use means for designating the references for selecting the print server that executes the image output for providing the information required by the system user, hence selecting the output apparatus flexibly corresponding to the unique request from the user.

With a view to solving the problems described above, the present invention is designed, and the printing control system of the present invention is structured as given below.

In other words, the printing control system for printing image data comprises a plurality of print servers for controlling the highly precise output of image data by the utilization of the image data accumulated on the image server for accumulating image data; and a print controller for designating the print server for receiving the transmission of image data from the image server on the basis of information different from the information designating the selection of each of the print servers prior to printing.

Also, the print controlling system of the present invention comprises an image server accumulating image data; and a print controller for designating the print server for receiving the transmission of image data from the image server on the basis of information different from the information designating the selection of each of the print servers prior to printing.

Also, the print controller of the present invention comprises selection means for selecting a plurality of print servers for controlling the image data output by the utilization of the image data accumulated on the image server for accumulating image data; and selection controlling means for controlling the selection of the print server for receiving the image data transmitted from the image server selected by the selection means on the basis of information different from the information designating the selection of each print server.

Also, the image server of the present invention is an image server for accumulating image data which comprises transmission control means for transmitting the desired images to the print server determined on the basis of information different from the information designating the selection of print server among a plurality of print servers for controlling the highly precise output of image data by the utilization of the image data accumulated on the image server prior to printing in accordance with the designation from the client designating the desired image printing.

Also, the information processing apparatus of the present invention is the one that designates the desired image printing, which comprises determination means for determining the selection of either the direct designation of a print server for controlling image data output or the designation of conditions of selecting a print server; selection means for selecting the print server for controlling the image output when the selection is made by the determination means to designate the print server direction; condition defining means for defining the conditions when the selection is made by the determination means to designate the conditions of selecting the print server; and print requesting means for preparing a print order on the basis of the conditions defined by the print server selected by the selection means or defined by the condition defining means, and transmitting the print order to the print controller.

Also, the method for controlling the print controller of the present invention is provided with the functions as given below: selection means for selecting a plurality of print servers for controlling the image data output by the utilization of the image data accumulated on the image server for accumulating image data; and selection controlling means for controlling the selection of the print server for receiving the image data transmitted from the image server selected by the selection means on the basis of information different from the information designating the selection of each print server.

Also, the method for controlling the print controller of the present invention is provided with the functions given below: the function for receiving designation from the client designating the desired image printing; and the function for controlling the transmission to transmit the desired images to the print server determined on the basis of information different from the information designating the selection of print server among a plurality of print servers for controlling the highly precise output of image data by the utilization of the accumulated imaged data prior to printing control in accordance with the designation.

Also, the method for controlling the information processing apparatus of the present invention is to control the information processing apparatus that designates the desired image printing, which comprises determination means for determining the selection of either the direct designation of a print server for controlling image data output or the designation of conditions of selecting a print server; selection means for selecting the print server for controlling the image output when the selection is made by the determination means to designate the print server direction; condition defining means for defining the conditions when the selection is made by the determination means to designate the conditions of selecting the print server; and print requesting means for preparing a print order on the basis of the conditions defined by the print server selected by the selection means or defined by the condition defining means, and transmitting the print order to the print controller.

Also, the storage medium of the present invention which stores on it the program for controlling the print controller is provided with the programmed functions given below: selection means for selecting a plurality of print servers for controlling the image data output by the utilization of the image data accumulated on the image server for accumulating image data; and selection controlling means for controlling the selection of the print server for receiving the image data transmitted from the image server selected by the selection means on the basis of information different from the information designating the selection of each print server.

Also, the storage medium of the present invention that stores on it the program for controlling the print controller is provided with the programmed functions given below: the function for receiving designation from the client designating the desired image printing; and the function for controlling the transmission to transmit the desired images to the print server determined on the basis of information different from the information designating the selection of print server among a plurality of print servers for controlling the highly precise output of image data by the utilization of the accumulated imaged data prior to printing control in accordance with the designation.

Also, the storage medium of the present invention that stores on it the program for controlling the information processing apparatus for designating desired image printing is provided with the programmed functions given below: the function to determine the selection of either the direct designation of a print server for controlling image data output or the designation of conditions of selecting a print server; the function to select the print server for controlling the image output when the selection is made by the determining function to designate the print server direction; the function to define the conditions when the selection is made by the determining function to designate the selecting conditions of the print server; and the function to prepare a print order on the basis of the conditions defined by the print server selected by the selecting function or defined by the function to define conditions, and to transmit the print order to the print controller.

DETAILED DESCRIPTION OF THE PREFERRED EMBODIMENTS

First Embodiment

<System Structure>

Figure 1:
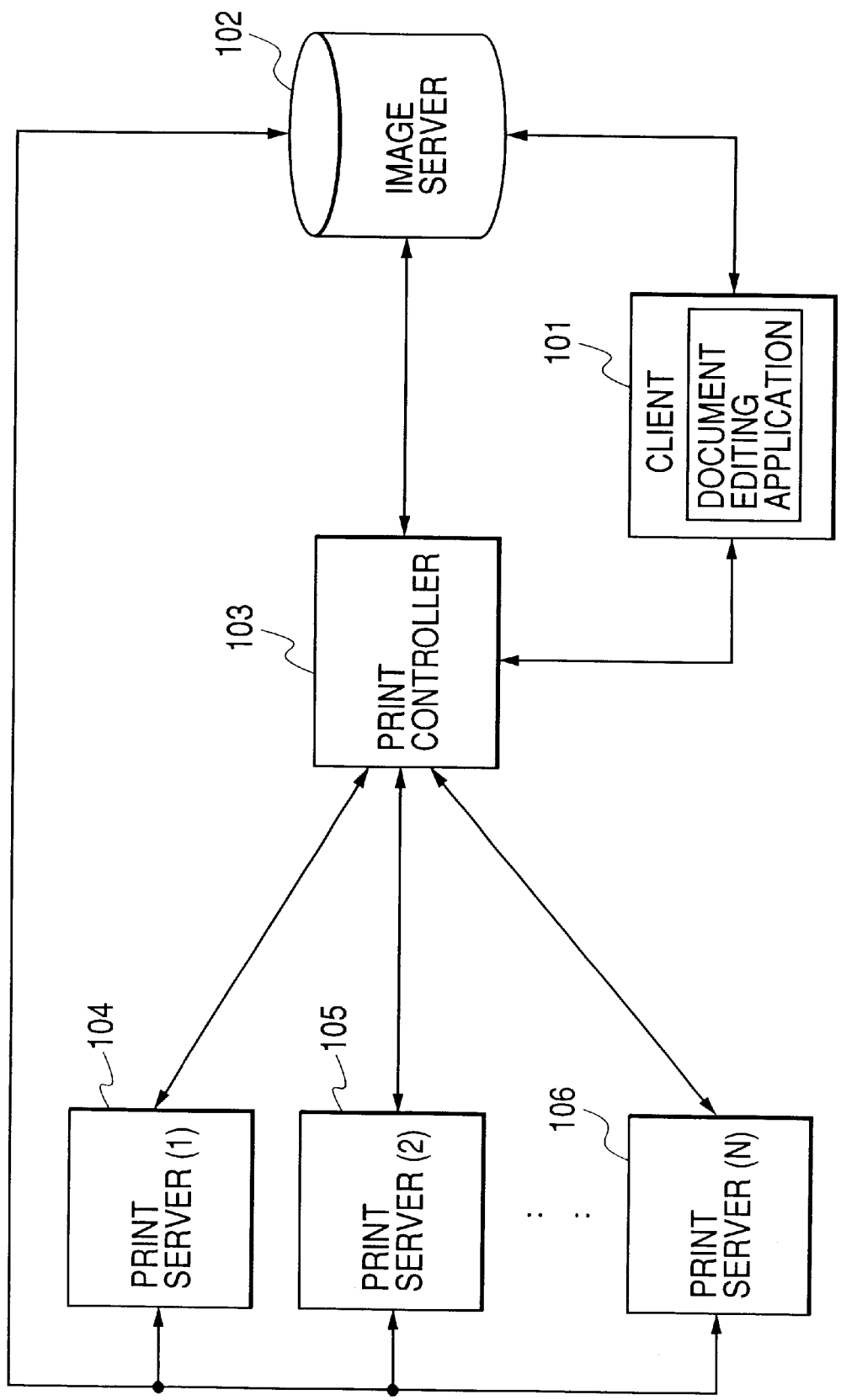
FIG. 1 is a structural diagram of a system in accordance with the present invention.

FIG. 1 is a view which shows the system structure under which the printing control is carried out in accordance with the present invention.

In FIG. 1, a reference numeral 101 designates a client computer that contains a document editing application. The client computer 101 is provided with the function of document production including character strings, graphics, images, and other data, and also, with the editing function thereof, and the function to convert the documentary data to the page description language using the functions of the document editing application.

A reference numeral 102 designates an image server, which holds in a plurality of resolutions the image data in the image format divisionally controlled by tiles (the FlashPix format: registered trade mark, for instance) and the ordinary image format which is not divisionally controlled (such as the JPEG format). Then, this server provides the image tile data on images through a net work in an arbitrary resolution specified for an image file.

A reference numeral 103 designates a print controller, which receives from the client computer 101 the print script and order written in the page description language, and selects the print server that processes such print order. Thus, the controller transmits the printing request on the basis of such print script and print order.

Reference numerals 104, 105 and 106 designate print servers, which obtain the image data in accordance with the print order received from the print controller 103, and print the image data by the editing process on the basis of the print script. The print server that embodies the present invention is an apparatus comprising a personal computer for editing use and a printer that can print and output highly precise images. The print server used for this system of this print service is installed in a print shop where a service is rendered to develop films.

The client computer 101, the image server 102, the print controller 103, and the print servers 104, 105, and 106 are connected with each other through signal transmission means such as net work. To describe specifically the connection adopted for the present embodiment, the client computer and the print server are connected with this printing system through the internet, that is, the on-line connecting method of the dial up or exclusive line mode. The print controller and the image server are connected through the internet using lines dedicated to them.

<Image Format>

Figure 2:
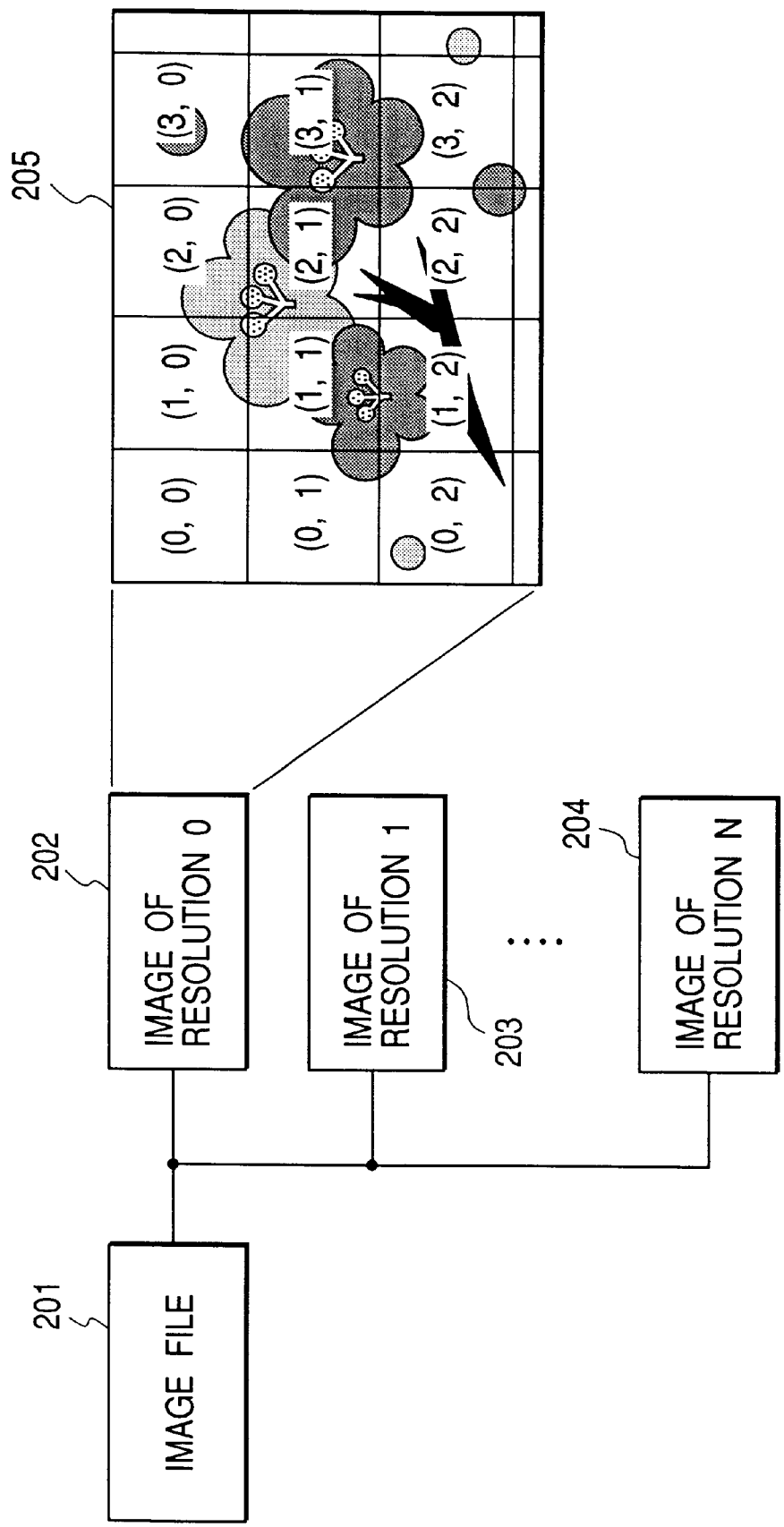
FIG. 2 is a view which illustrates an image format to be used for the present invention.

FIG. 2 is a view which illustrates the image format of the FlashPix (trade mark) which is one of the embodiments of the image data to be used for the present invention. For the image server 102, a plurality of image files are prepared in the image format to be described herein. It is of course possible to adopt for the present invention any other image files than the FlashPix format which will be described later. There are bitmap data, JPEG, TIF, ZIP, and others as compressed format other than the FlashPix image format. The image data in any one of the formats can be used appropriately for the present invention as a matter of course.

A reference numeral 201 in FIG. 2 designates the image file prepared in the FlashPix format. The image file 201 holds images hierarchically in a plurality of resolutions from zero to n resolution. The smaller the value of the subscript, the higher is the resolution. The zero resolution is the highest one. As the value of the subscript is increased by one, the resolution becomes 1/2. Reference numerals 202, 203, and 204 designate images of resolution 0, resolution 1, and resolution n, respectively.

The image of each resolution is divisionally controlled by the square image tiles each having a fixed number of pixels. Here, a reference numeral 205 shows the relationship between the image of resolution 0 in the image file 201 and the image tiles that form this image. The indices of (X, Y) mode indicated on the image tiles are the image tile Ids that discriminate one image tile from another in the image.

Since the number of pixels of the image tile is fixed, the numbers of image tiles and Ids that indicate one and the same portion are different between images having different resolutions. For example, the area of an image tile of resolution 1 that indicates one and the same portion is four times larger than that of the image tile that indicates one and the same portion in resolution 0. Therefore, the area indicated by four image tile IDs (0, 0), (1, 0), (1, 0), and (1, 1) in resolution 0 is equal to the area indicated by the one image tile ID (0, 0) in resolution 1.

As described earlier, the image server of the present invention has image data of plural resolutions, which makes it possible to use images of lower resolutions for processing images of lower resolutions that should be edited. As a result, there is an effect that the operativity is enhanced by reducing the amount of memory to be used or by making the processes of data transmission and reception faster.

<Script>

Figure 3:
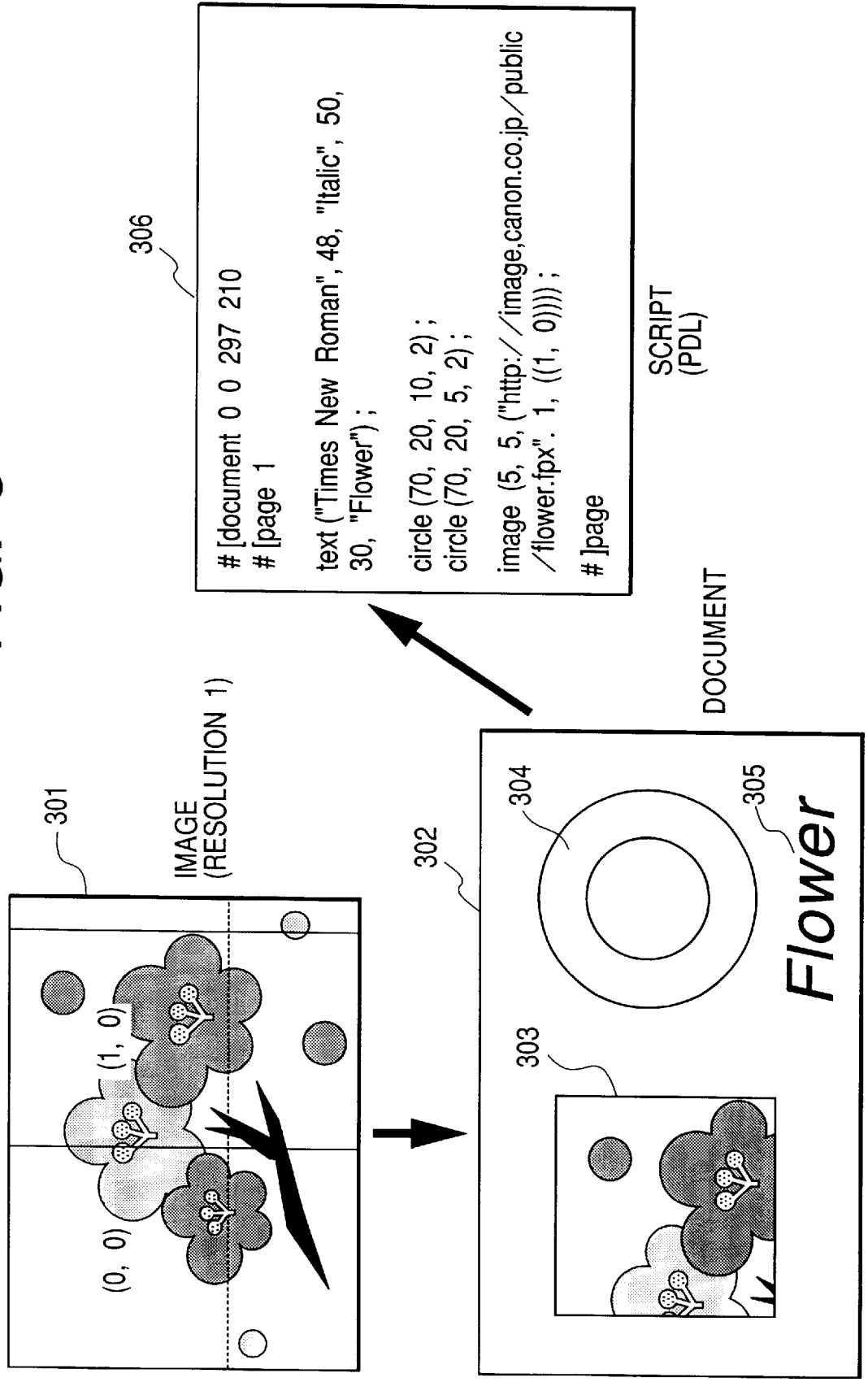
FIG. 3 is a view which illustrates the example of script written in the page description language, which is used for the present invention.

FIG. 3 is a view which illustrates one example of script described in the page description language to be used for the present invention.

In FIG. 3, a reference numeral 301 shows the relationship between the image 203 of resolution 1 and the image tiles represented in FIG. 2.

A reference numeral 302 designates a document prepared by the document editing application loaded on the client computer 101.

Reference numerals 303, 304, and 305 designate image data, graphical data, and data on character strings of the document 302, respectively.

A reference numeral 306 designates the script obtained by converting the document 302 to the page description language by use of the document editing application loaded on the client computer 101.

The client computer 101 requests the image data of lower resolution as the image for editing use from the external device, such as an image server, that stores the image data, and obtains the image data of the lower resolution. Here, by the image of resolution 1 used for editing the document by means of the document editing application loaded on the client computer 101, the amount of memory needed for such editing is reduced. Also, when receiving image data through the net work, the amount of data that should be transmitted is made smaller to produce a favorable effect. Also, for the present embodiment, the client computer 101 is connected with the image server through the internet having the dial up mode. It may take a considerable time for transmission and reception if image data of higher resolution should be transmitted or received. This requires higher line fees, which leads to increased costs inevitably. Therefore, for the present invention, it is arranged to transmit or receive image data of lower resolution through the internet and make its connecting time shorter in order to reduce the line fees are accordingly. Also, in accordance with the present embodiment, the image of resolution 1 is adopted, but it is more effective to use images of lower resolutions, such as resolution 2 or 3, because the amount of data to be transmitted or received is then made smaller still.

Of the image 301, only the portion of the image tile ID (1, 0) is contained in the document 302. When the document 302 is converted to the script 306, the portion of the image data 303 is not fetched as it is, but what are fetched to be written are: the image file ID that indicates the location where the image file 201 is available; the resolution index; and the image tile ID. Then, the image data are fetched when the script is processed. In this way, it becomes possible to make the size of the script smaller, thus reducing the load in transmitting or receiving the data through the net work.

For the script 306, the numerals that follow the documents indicate the document IDs, which are uniquely provided by the document editing application. The numerals that follow the pages indicate the page numbers. Those which follow the text indicate the word "Flower" to be written in the font of "Times New Roman" in 48 in Italic at the position of 50 and 30. The word "circle" means an instruction to draw a circle. Information is given to indicate that the circle is written at the position of 70 and 20 with the radius of 10 in the thickness of 2. Lastly, the word "image" indicates the presence of image data, meaning that the tile image (1, 0) of the image data of resolution 1 is used at the position of 5 and 5, which is available at the URL of "httb://image.canon.co.jp/public/flower_fpx".

In this way, the history of the editing instructions, which is compiled by the document editing application loaded on the client computer 101, is retained as a file in the script form. The editing referred to in the present embodiment means those given below. In other words, it includes the mosaic processing, shading, color balancing, gradational conversion (including gray scale processing), and some others with respect to the image data as a whole. Further, the addition of the template (image data) that indicates the frame and others within which photographs and/or texts are inserted, and of the data such as stamps and illustrations, as well as the graphical drawing and text insertion are also included in the definition of the editing process referred to in the present embodiment. The data in the script mode are made available by the client computer 101 as the history of editing thus defined that provides editing information.

As described above, the client computer 101 requests the image server to provide image data of lower resolution through the internet which is connected in the dial up mode, and receives the image data of the lower resolution. Then, the image data of the lower resolution is edited in the client computer 101 to create the history information complied as editing information in the script mode. After that, the editing information is transmitted to the print controller through the internet which is connected in the dial up mode, hence issuing the print order as required. The user is able to edit the image data as he likes, and make the print order in a smaller amount of data as the editing history. In this way, the user transmits the editing information as the print order that contains the IDs of the image data to be edited, making it possible to shorten the internet connecting time when sending the print order.

<The Block Diagram of the Print Controller>

Figure 4:
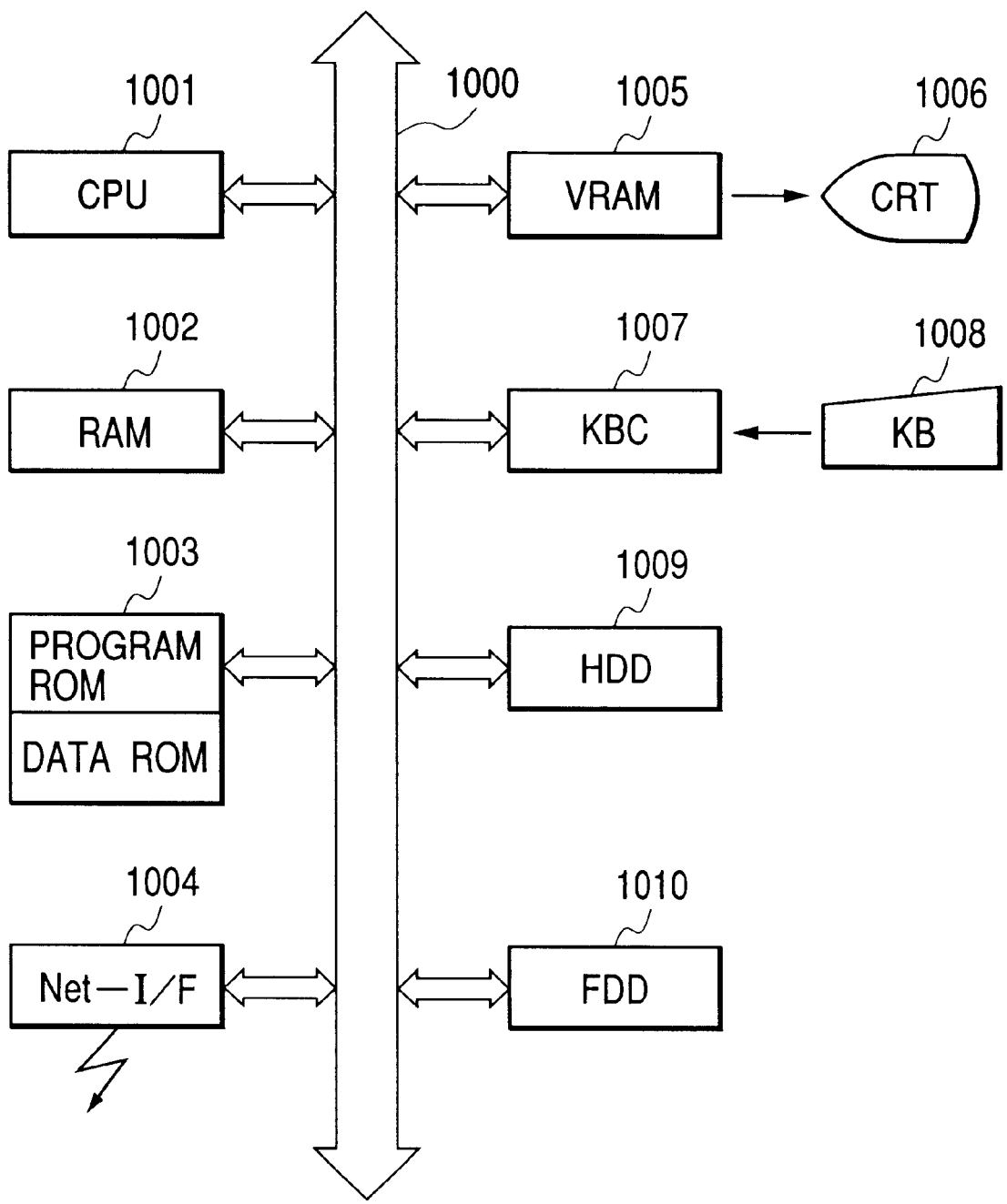
FIG. 4 is a block diagram which shows the system structure of a print controller to be used for the present invention.

FIG. 4 is a block diagram of the system structure of a print controller.

In FIG. 4, a reference numeral 1001 designates a CPU that controls the entire body of the apparatus. The CPU 1001 functions as control means.

A reference numeral 1002 designates a RAM that functions as provisional storage means. The RAM 1002 serves as the main memory of the CPU 1001, as well as functions as the work area and the provisional save area for the execution of programs stored in a ROM 1003.

A reference numeral 1003 designates the ROM that stores the operational process procedures of the CPU 1001. The ROM 1003 comprises a program ROM that stores the system program to control the devices of the print service controller and a data ROM that stores information and others required to operate the system.

A reference numeral 1004 designates the net work interface (Net-I/F) that functions as external transmission and reception means. The net work interface 1004 performs the data control and diagnosis for the data transmission and reception through the net work system (internet or the like) that controls data transmission and reception to and from the print server that will be described later, as well as connects this system with the user terminals.

A reference numeral 1005 designates a video RAM (VRAM) that functions as storage means for display use. The video RAM 1005 develops images to be displayed on the screen of a CRT 1006 that functions as display means for indicating the operational status of the system, and controls such indication.

A reference numeral 1007 designates a keyboard controller that controls the input signals from the keyboard and other external input devices. A reference numeral 1008 designates an external input device that accepts operations. Generally, it is a keyboard, a pointing device (mouse) or the like.

A reference numeral 1009 designates a hard disc drive (HDD) that functions as storage means, which is used for holding application programs to be described later, and data on image information.

Figure 6:
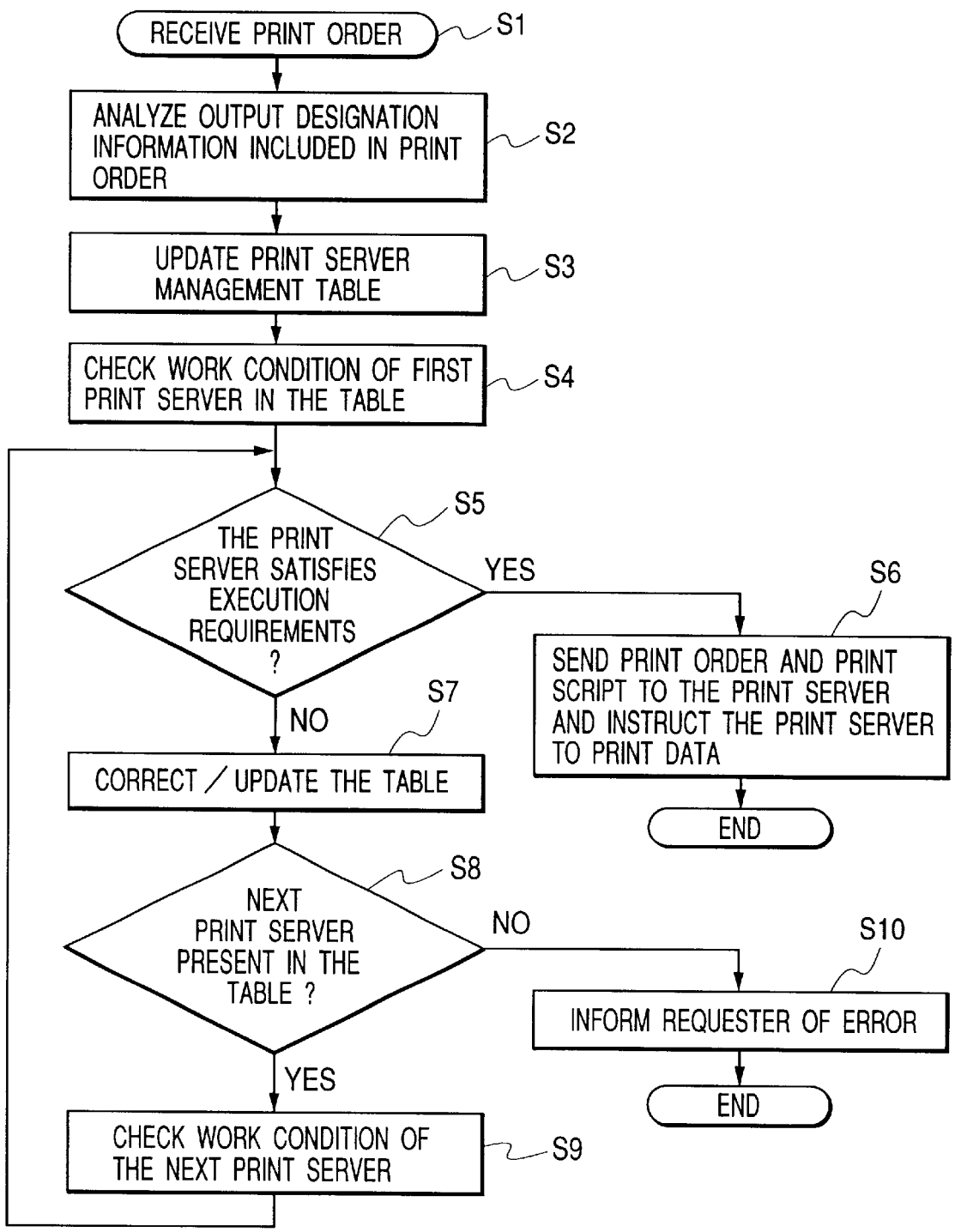
FIG. 6 is a flowchart that shows the processing of the print controller in accordance with the present invention.

A reference numeral 1010 designates a removable disc drive (FDD) such as a floppy disc that functions as external storage means, which is used for reading out from the medium of application program to be described later. The program represented by the process flow shown in FIG. 6 is stored on the floppy disc 1010, and also stored on the hard disc. Then, the system herein may become executable.

A reference numeral 1000 designates I/O buses (address bus, data bus, and control bus) that connect each of units described above.

<The Block Diagram of Print Servers>

Figure 5:
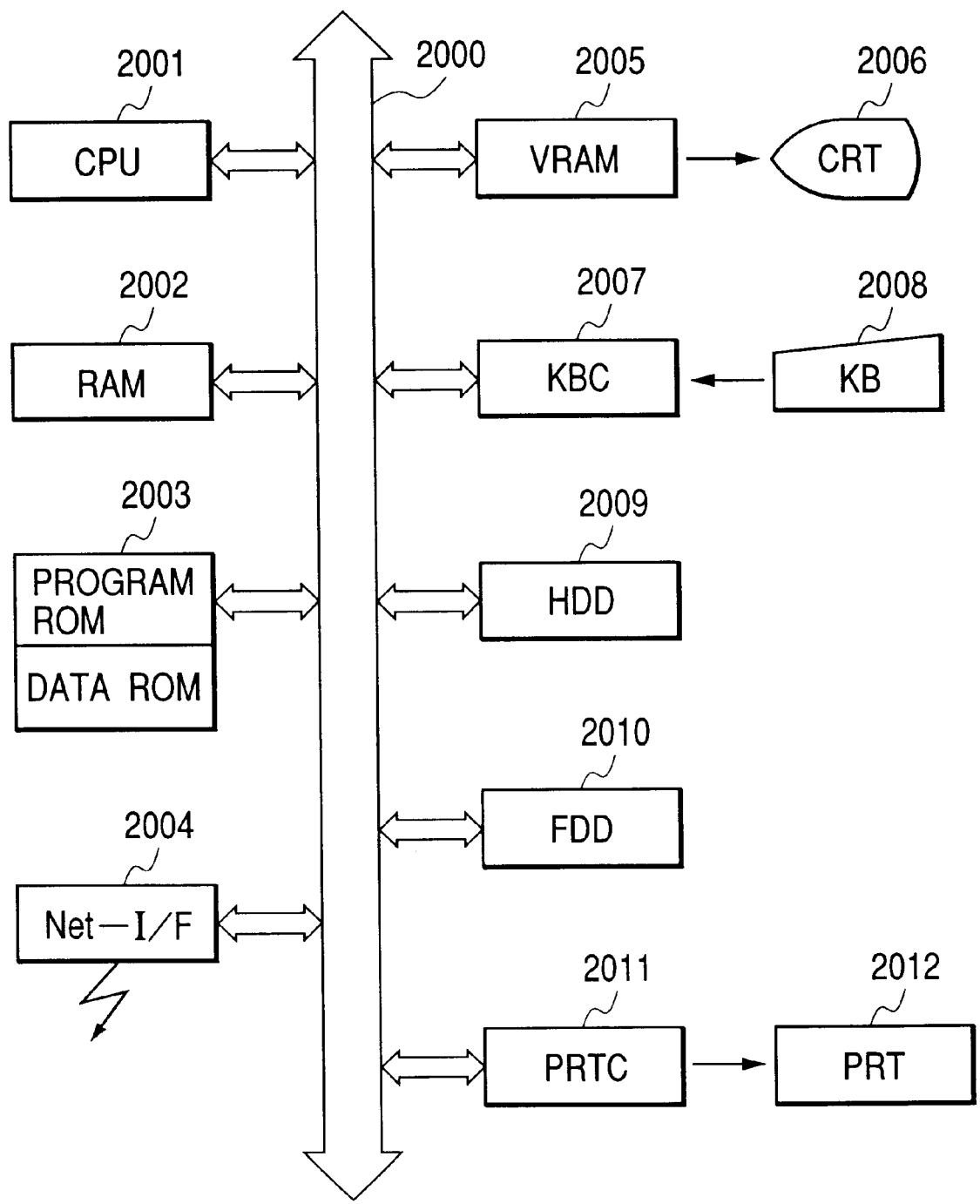
FIG. 5 is a block diagram which shows the system structure of a print server to be used for the present invention.

FIG. 5 is a block diagram which shows the system structure of print servers 104 to 106. In FIG. 5, a reference number 2001 designates the CPU that controls the entire body of the apparatus.

A reference numeral 2002 designates a RAM that functions as provisional storage means. The RAM 2002 serves as the main memory of the CPU 2001, as well as functions as the work area and the provisional save area for the execution of programs stored in a ROM 2003.

A reference numeral 2003 designates the ROM that stores the operational process procedures of the CPU 2001. The ROM 2003 comprises a program ROM that stores the system program to control the devices of the print service controller and a data ROM that stores information and others required to operate the system.

A reference numeral 2004 designates the net work interface (Net-I/F) that functions as external transmission and reception means. The net work interface 2004 performs the data control and diagnosis for the data transmission and reception through the net work system (internet or the like), and controls data transmission and reception to and from the other print server and image server.

A reference numeral 2005 designates a video RAM (VRAM) that functions as storage means for display use. The video RAM 2005 develops images to be displayed on the screen of a CRT 2006 that functions as display means for indicating the operational status of the system, and controls such indication.

A reference numeral 2007 designates a keyboard controller that controls the input signals from the keyboard and other external input devices. A reference numeral 2008 designates an external input device that accepts operations. Generally, it is a keyboard, a pointing device (mouse) or the like.

A reference numeral 2009 designates a hard disc drive (HDD) that functions as storage means, which is used for holding application programs to be described later, and data on image information.

Figure 10:
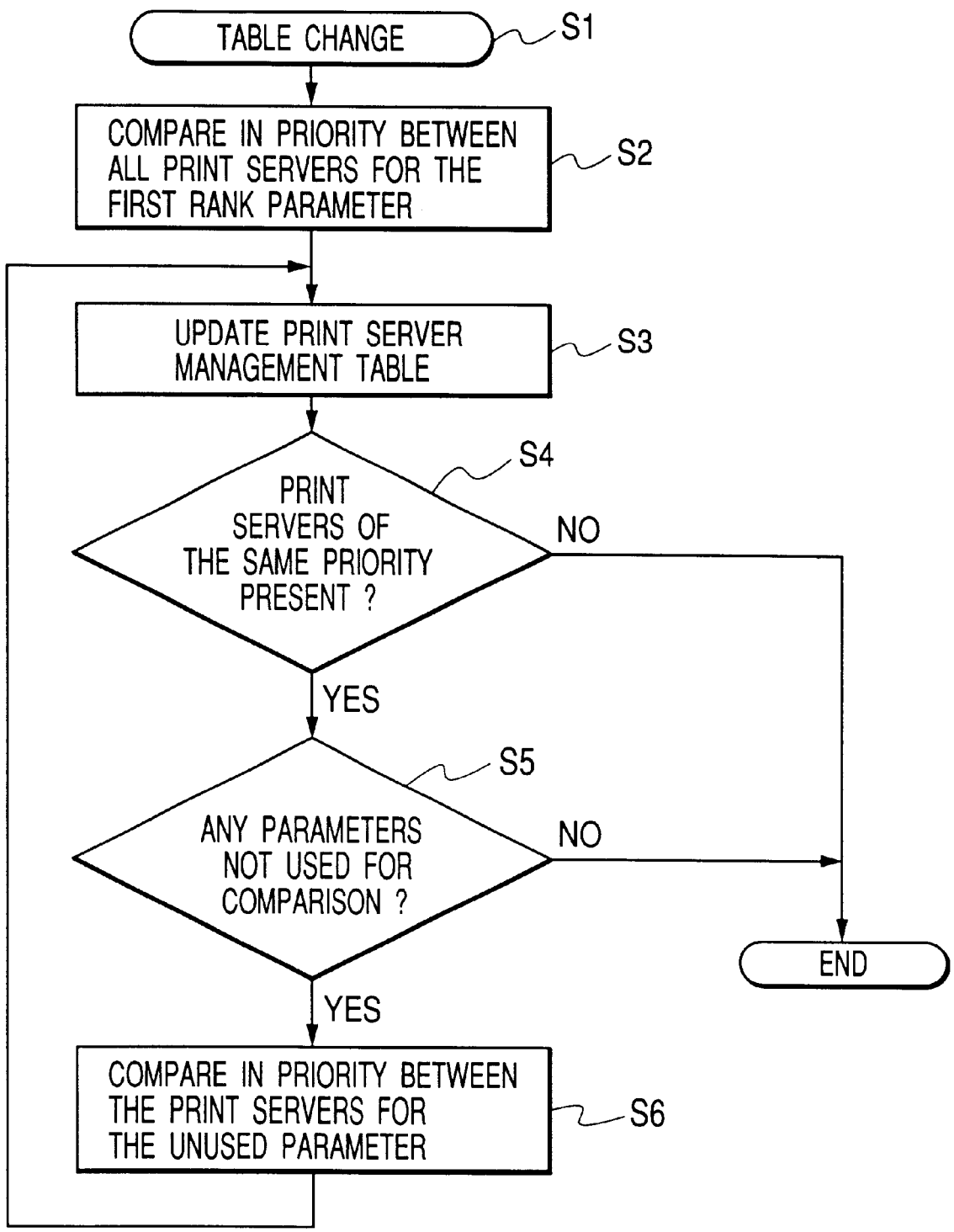
FIG. 10 is a flowchart which shows the process flow in which the print server management table is being changed.

A reference numeral 2010 designates a removable disc drive (FDD) such as a floppy disc that functions as external storage means, which is used for reading out from the medium of application program to be described later. The program represented by the process flow shown in FIG. 10 is stored on the floppy disc 1010, and also stored on the hard disc. Then, the system herein may become executable.

A reference numeral 2011 designates a printer controller (PRTC), which controls a printer 2012, as well as controls the images to be output.

A reference numeral 2012 designates a printer that functions as printing means for performing print output of highly precise images by use of the print server. It is arranged for the printer 2010 that plural printers are connected by one print server.

A reference numeral 2000 designates I/O buses (address bus, data bus, and control bus) that connect each of units described above.

<The Description of Operation>

At first, in conjunction with FIG. 3, the description will be made of the entire operation of this system.

The user obtains from the image server 102 the image data 303 of the image tile ID 9003 (1, 0) among the image 203 of resolution 1 in the image file 201 by way of the internet of the dial up connection mode using the function of the document editing application loaded on the client computer 101, and produces the document 302.

When the user issues the request of a print service, the document editing application loaded on the client computer 101 converts the document 302 to the script 306, and adds the print order for the preparation of a print order file, which is transmitted to the print controller 103 through the internet in the dial up connection mode. The print order information contains address, name, credit cart number and other personal information (#User ID), printing range (#PageRange), printed copies (#Copies), payment details (#Payment), and other printing information.

The print controller 103 determines the print server 104 that executes printing by use of the print server determination means which will be described later. Then, the printing request is transmitted to the server 104 on the basis of the script 306.

The print server 104 decodes the printing request thus received on the basis of the script 306, and obtains from the image server 102 the image data in the specified resolution of the script written on the printing request or the image tile data 303. Thus, the print server executes printing by use of the printer 2012 by synthesizing the printing image of the document 302 with the other image information (304 and 305) of the script and image data or image tile data 303.

<The Print Controller Processing>

FIG. 6 is a flowchart which shows the process flow of a print controller in accordance with the present invention.

In FIG. 6, a series of processes begins in S1 when a print order and a print script are transmitted from the document editing application loaded on the client computer 101 to the print controller 103.

The print order contains information needed for selecting a print server for the output execution (output designation information) in the format which will be described in conjunction with FIG. 7. In S2, the output designation information of the print order is analyzed.

In S3, the print server management table is updated, if necessary, in accordance with the result of the analysis made on the output designation information.

The print server management table is used for controlling the status of the print servers (104, 105, and 106) which are connected in the system so as to determine the print server that should be used for the execution of the output in accordance with the print order. (The details will be described in conjunction with FIG. 8.)

In S4, the operational status of the print server is confirmed for the one positioned at the head of the table. Then, whether or not such print server is usable is determined in S5. After that, if affirmative, the print order and print script are transmitted to the print server in S6, thus designating the image output.

In the S5, if it is determined that the executable condition of the print server is not satisfied, the print server management table is corrected and updated accordingly in S7.

When the print server management table is updated, it is determined in S8 whether or not there is any print server that may be usable in accordance with the result of such updating. If affirmative, the status of such print server is confirmed in S9, and then, the process returns to the S5.

In the S8, if the next printer server cannot be found, an error message is notified to the user in S10 or required means is taken for dealing with any abnormal processing. Then, the series of the processes terminates.

<The Print Server Processing>

The print server 104 and others create the output images in compliance with the printing request that includes the print order and print script processed and transmitted by and from the print controller 103. Then, the print server outputs images to the printer 2012 connected with it.

If image information is contained in the print script that has been transmitted, the required image tiles are directly obtained from the image server 102 on the basis of such information. Then, when the output image is created, it is synthesized to contain such image tiles, and the image thus created is output to the printer 2012.

At this juncture, the image data and image tiles that have been used are held on the HDD 2009 of the print server for a specific period of time. If a printing is requested for the image output for which the same image data and image tiles should be used within such specific period of time, it becomes possible to lighten the burden given to transmitting the image data and image tiles again from the image server 102 by use of the image data and image tiles, which are thus held on the HDD last time.

<The Print Order>

Figure 7:
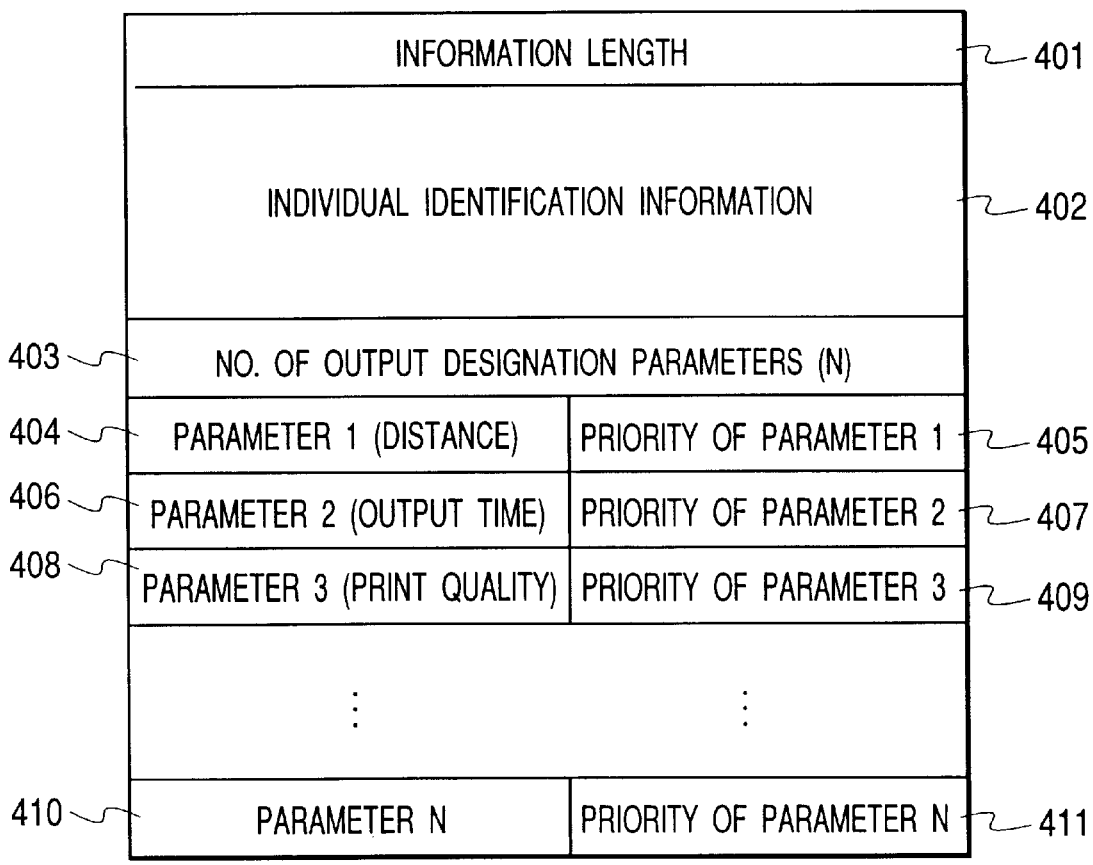
FIG. 7 is a view which schematically shows the format of a print order to be transmitted to the print controller in accordance with the present invention.

FIG. 7 is a view which schematically shows the print order format to be transmitted to the print controller 103 from the client computer 101 which is provided with the document editing application for the client who requests the image output.

In FIG. 7, a series of information at 401 to 411 are transmitted to the print controller 103 together with the print script as information required for printing.

In FIG. 7, a reference numeral 401 designates parameters that indicate the individual identification information, and 402 that follows it indicates the data length (data size) of such individual identification information.

The individual identification information 402 are those needed for confirming the client of the image output, which contain the ID information such as the name of individual and the password, as well as the information needed for charging management fees. However, such information are not essentially important for describing the contents of the present invention. Here, therefore, none of them are referred to in detail.

Information at 403 and on are those of the output designation required for selecting the print server for the execution of image output.

The information at 403 indicates the numbers of output designation parameters in use. If the length thereof is zero, it means that the client does not designate any particular print server for image output. Then, the default print server is used for the output purpose (which is the one on the top of the print server management table provided for the print controller).

The information at 404, 406, 408, and 410 are the parameters which may become the references of the output designation. For example, these are IDs that provide the factors for uniquely determining the print server, such as distance and image quality, among some others. In FIG. 7, the information at 404 is distance given as the parameter 1; 406, output time as the parameter 2; and 408, print quality as the parameter 3, for example.

The information at 410 indicates that the parameters are prepared in N numbers. Therefore, the numbers of the output designation parameters are given as N at 403.

Also, at 405, 407, 409, and 411, each numerical value (priority) is shown to indicate the priority of each of the parameters 1, 2, 3, and N. Here, the priority of each parameter is not dependent upon the arrangement order within the data, but it is determined correlatively in accordance with the order of priority of each of them.

However, if the priorities are equal, the order of priority is determined in accordance with the procedures established for the purpose of making such determination within the print controller. As a result, the order of priority cannot be ascertained only in accordance with the information given here.

In this respect, it is unnecessary to provide such information of output designation for the print order which is transmitted from the print controller 103 to the print server 104 or others. Therefore, not all the print orders contain the information of the kind.

<The Print Server Management Table>

Figure 8:
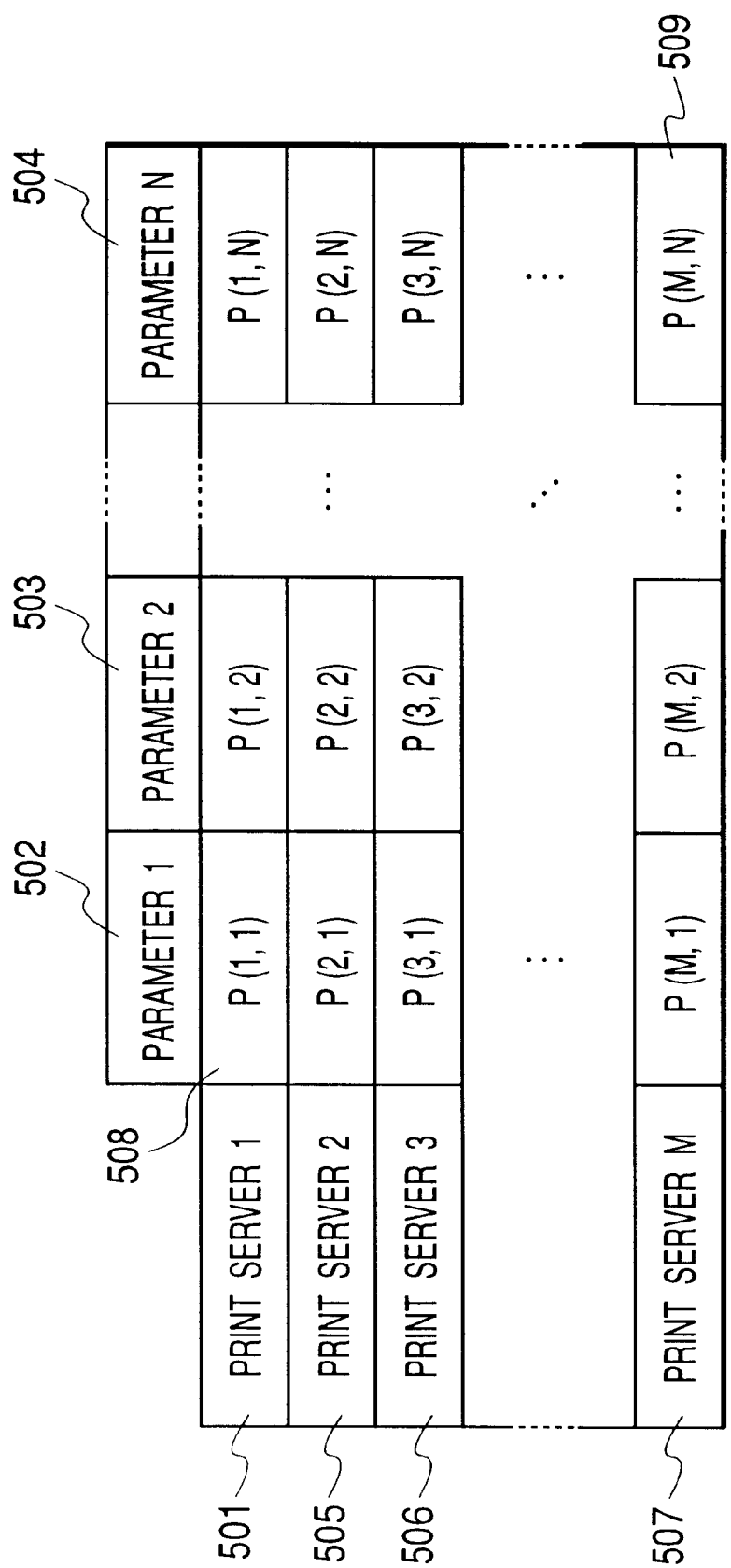
FIG. 8 is a view which schematically shows the format of a print server management table to be controlled by the print controller in accordance with the present invention.

FIG. 8 is a view which schematically shows the format of the print server management table to be controlled within the print controller 103.

For this table, there is recorded the frequency of each of the parameters, which is related to all the print servers connected within the system. Depending upon the value of such frequency, the preference of print servers is determined.

In FIG. 8, a reference numeral 501 designates the line that indicates the parameter values of the print server 1, for example. On this line, the frequencies are recorded for the parameters 1, 2, and N.

Each line on the table means each of the parameters. In FIG. 8, reference numerals 502, 503, and 504 means the parameter 1, parameter 2, and parameter N, respectively, for example.

The same line as at 501 is prepared for each of the print servers (in FIG. 8, these are prepared in M numbers). At 505, the line is for the print server 2; 506, the print server 3; and 507, the print server M, respectively.

For the table, numerical values are recorded with respect to each of the printer servers and parameters. For example, at 508, the P(1, 1) is the value that indicates the numerical value of the parameter 1 for the print server 1. At 509, the P(M, N) is the value that indicates the numerical value of the parameter N for the print server M. Between print servers, these values are compared for each of the lines to compare the preferences of certain parameter.

For this table, the order of print server lines is assumed to be in agreement with the preference order of the print server that executes image output. (In other words, the order of priority is assumed to be the order of 1, 2, 3, ..., N in FIG. 8.) Therefore, when the parameter frequency of each print server changes, the order of lines on the table is corrected as required.

Also, the preference of each print server is changed and determined in accordance with the order of priority of the parameters provided by the information of output designation (see FIG. 7) written on the print order transmitted from the client computer 101. In this case, too, the line order for the table is corrected again.

Here, the print server management table is stored on the hard disc 1009 shown in FIG. 4, and developed on the RAM 1002 for use.

<The Correction Example 1 of the Print Server Management Table>

Figure 9:
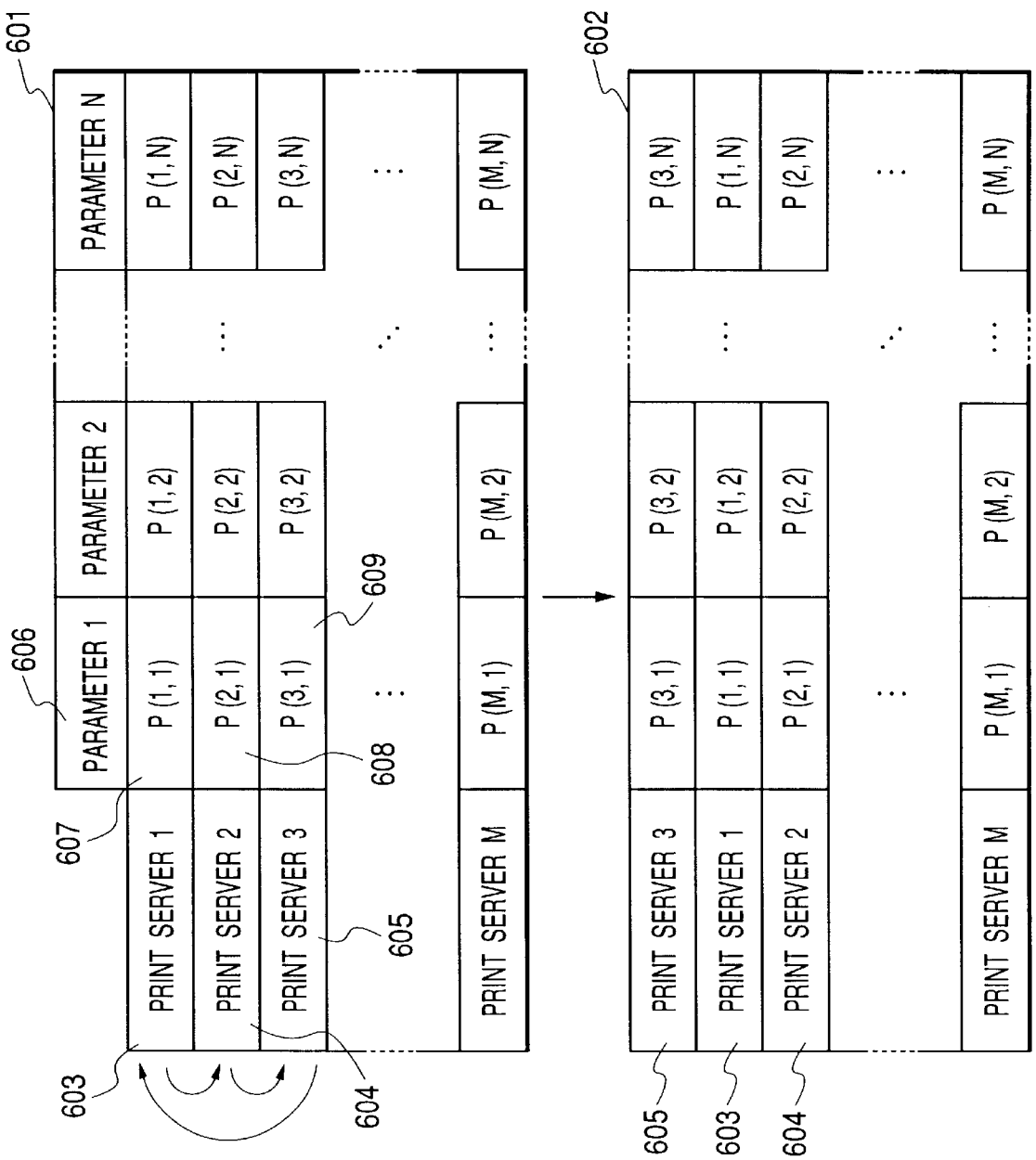
FIG. 9 is a view which schematically shows the changing status of the print server management table.

FIG. 9 is a view which schematically shows the state where the print server management table represented in FIG. 8 is being updated.

In FIG. 9, a reference numeral 601 designates the print server management table before having been updated; and 602, the state where the table is updated.

At 603, 604, and 605, the lines indicate each of the statuses of print servers 1, 2, and 3. At 606, the line indicates the status of the parameter 1. Here, the parameter 1 which is at the uppermost position is assumed to be the parameter having the top priority.

Now, assuming that the frequencies of the parameter 1 are P(1, 1) (607), P(2, 1) (608), P(3, 1) (609), respectively, with respect to the print servers 1, 2, and 3, these values are compared. For example, if there is a relationship between these values as shown below, $$P(3, 1) > P(1, 1) > P(2, 1) \qquad \text{(formula 1)}$$

the table is modified to correct the order to be 605, 603, and 604 as indicated at 602 in accordance with the order of priority.

In this way, the print server management table changes at any time depending on the changes of the parameter frequencies of each print server.

FIG. 10 is a flowchart which shows the process flow in which the print server management table is being changed as described above.

In FIG. 10, the contents of the table should be changed for some reasons in S1. It is caused by the process in the S3 or S7 in FIG. 6, for example.

In S2, the orders of priorities are compared for each of print servers with respect to the most significant parameter on the basis of the information contained in the management table.

In S3, if any updating is required for the management table as the result of such comparison, the table is updated.

Usually, the updating of the table terminates at this point, but if there are the print servers having the same priority order, the following processes are executed in continuation:

In S4, it is examined if there any print servers having the same priority order. If negative, the process terminates.

If affirmative, the examination is made in S5 to find whether or not there are still any parameters remaining unused for comparison.

If any unused parameters are found, the comparison is made in S6 for determining the order of priority of the server on the basis of such parameters thus found. Then, the process returns to the S3.

In the S5, if no parameters are found to be unused, there is no way to carry out any comparison. Therefore, the updating of the table terminates while the serves having the same order remain unchanged in the status before updating.

<The Correction Example 2 of the Print Server Management Table>

Figure 11:
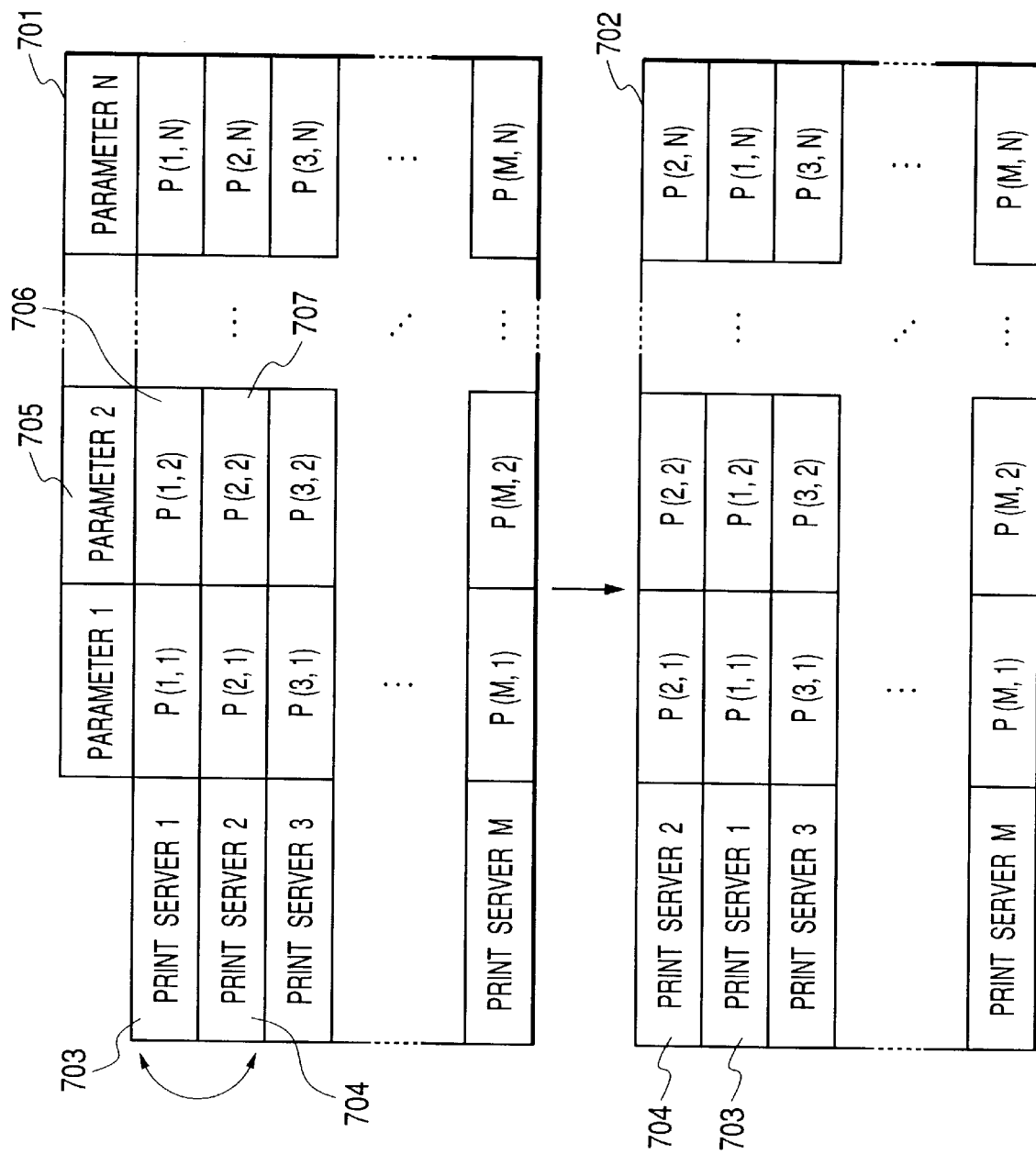
FIG. 11 is a view which schematically shows the changing status of the print server management table.

FIG. 11 is a view which schematically shows the state where the print server management table is being updated when the order of priority of parameters is changed in accordance with the output designation information contained in the print order represented in FIG. 7, and also, updated when any different order of priority is required in accordance with the output designation information.

In FIG. 11, a reference numeral 701 designates the print server management table before having been updated and 702, the state of the table after updating.

Reference numerals 703 and 704 designate the status of the print servers 1 and 2, respectively, and 705, that of the parameter 2.

Here, it is assumed that the output designation information is received to give priority to the parameter 2, while the parameter 1 is being given priority within the print server management table, and the table currently represents the status that corresponds to the condition of the parameter 1.

Now, assuming that the frequencies of the print servers 1 and 2 with respect to the parameter 2 are P(1, 2) (706), P(2, 2) (706), the conditions within the line 705 that includes these values are compared in order to determine the order of priority for the parameter 2. For example, if the values are in the relationship of:

$$P(2, 2) > P(1, 2) \tag{formula 2}$$

the table changes in accordance with the order of priority to modify the order as at 702.

The flow of the processes described above is substantially the same as those described in the flowchart shown in FIG. 10. Therefore, no description will be made with the provision of any particular new flowchart.

In FIG. 10, after factors take place for changing the table in S1, the print server management table is updated in accordance with the order of priority designated in the print order.

After that, the processes in S2 and on in FIG. 10 are executed.

<In a Case Where the Comprehensive Aspect is Introduced into the Method for Determining the Order of Priority>

The method for determining the order of priority of the print servers described in conjunction with FIG. 9 and FIG. 11 is such that each of the parameters is handled individually to define the parameter having the higher priority as absolute condition. However, when this method is generally practiced for execution, it may be possible to determine the orders of the plural parameters by the application of the comprehensive evaluation thereof, not defining each individual parameter as its factors for making determination.

Figure 12:
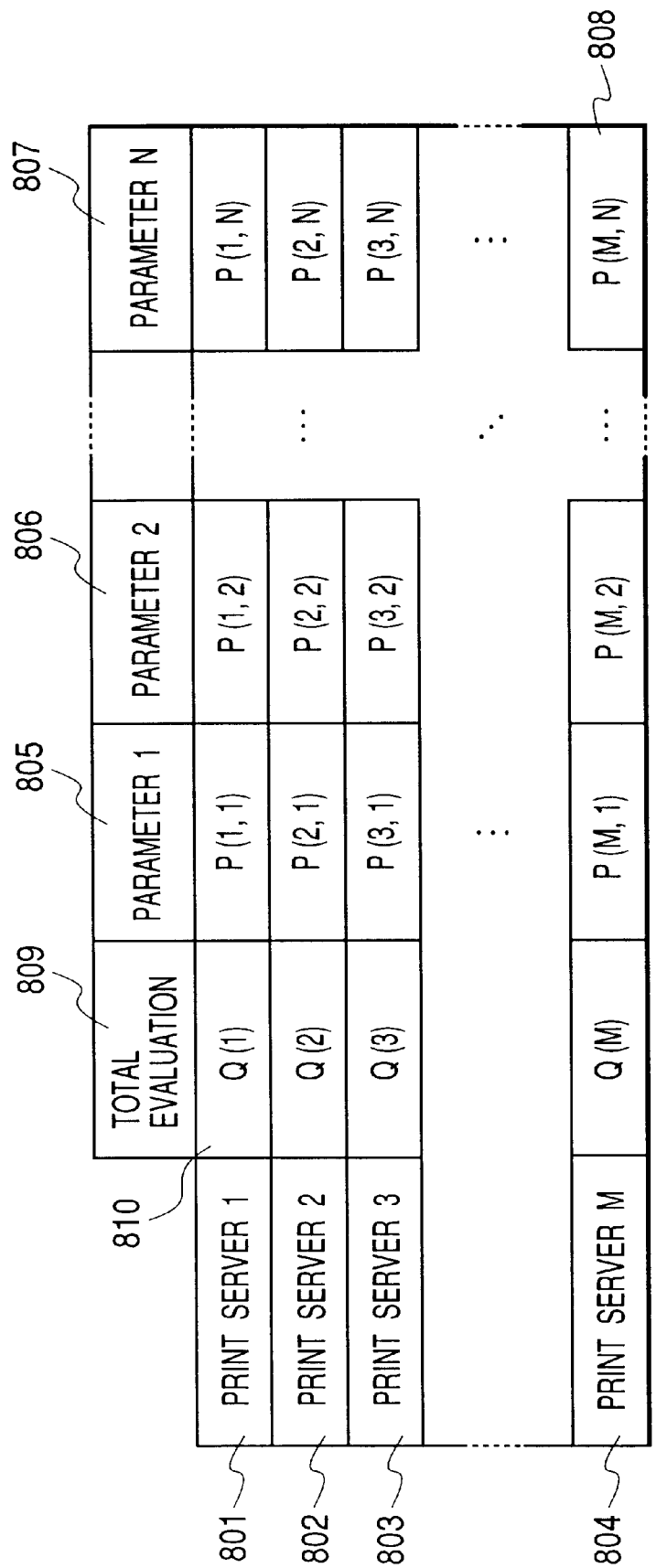
FIG. 12 is a view which schematically shows another example of the print server management table having the comprehensive evaluation introduced into the table.

FIG. 12 is a view which schematically shows the print server management table when it is used for the comprehensive evaluation.

In FIG. 12, each of the lines at 801, 802, 803, and 804 records each of the print servers 1, 2, 3, and M, and the comprehensive evaluation, respectively. Here, it is assumed that the numbers of print servers usable within the system are M in total.

Each of the lines at 805, 806, and 807 records the order of priority for each of the print servers with respect to the parameters 1, 2, and N, respectively. In this respect, it is assumed that the number of parameters are N in total.

Here, P(M, N) at 808 indicates the order of priority for the parameter N of the print server M.

The line. at 809 records the comprehensive evaluation of the print servers, which is calculated on the basis of all the parameters. A reference numeral 810 designates the score of the comprehensive evaluation of the print server 1.

Here, it is assumed that the print servers on each of the lines are arranged from the top to bottom in accordance with the larger scores of the comprehensive evaluation thereof. Therefore, when the print order is received, the output is tried one after another from the print servers having the higher comprehensive evaluation corresponding to this table.

Conceivably, the method for calculating the score of the comprehensive evaluation is as follows, for example:

A coefficient is set corresponding to the higher priority of each of the parameters, and the score of the comprehensive evaluation is the sum obtainable by multiplying the priority of each print server of each parameter by this coefficient.

In other words, given the coefficient of the parameter N as A(N), this can be expressed in the following formula:

$$Q(M) = A(1)*P(M, 1) + A(1)*P(M, 1) + \ldots + A(N)*P(M, N) \tag{formula 3}$$

Here, the coefficient A(M, N) is defined as fixed, but it may be made variable in accordance with the status of the system and the contents of a print order.

<The Loading of Program from a Medium>

Figure 13:
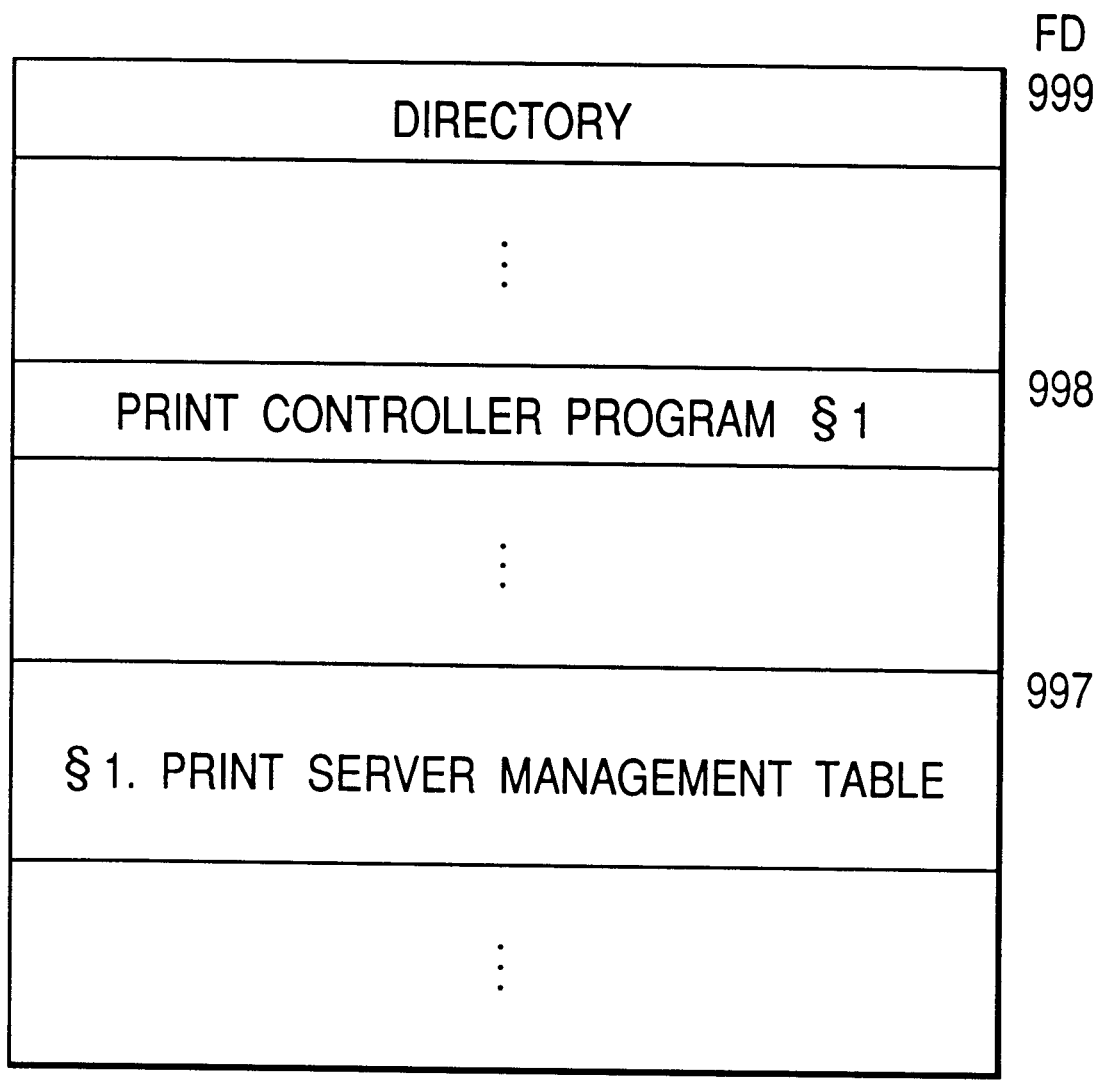
FIG. 13 is a view which shows a memory map in the external storage medium of the print controller.

FIG. 13 is a view which shows one example of the memory map of the program for the print controller, which is stored on an external storage medium (a floppy disc or other removable disc)

In FIG. 13, a reference numeral 999 designates the region where the directory information is stored, which indicates the storage location 998 of the print controller program that follows it.

Also, the region 998 indicates the storage location 997 of the print server management table to be used for this program.

The print controller program is installed by reading out the stored program from the location 998 of this memory map, and loaded on the RAM 1002.

At this juncture, the print server management table is loaded on the RAM 1002 from the location 997 and used for the program during its processing.

Figure 14:
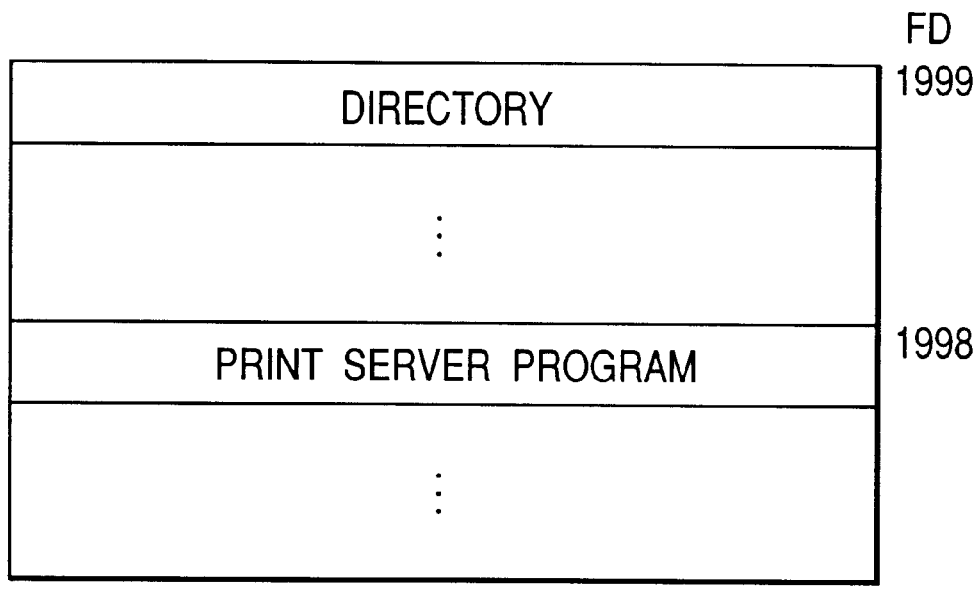
FIG. 14 is a view which shows a memory map in the external storage medium of the print server.

FIG. 14 is also a view which shows one example of the memory map of the program of a print server stored on the external storage medium (a floppy disc or other removable disc).

In FIG. 14, a reference numeral 1999 designates the region where the directory information is stored, which indicates the storage location 1998 of the print server program that follows it.

On the FDD 2010, the print server program is installed by reading out the stored program from the location 1998 of the memory map, and loaded on the RAM 2002 to make it executable.

Second Embodiment

For the embodiment described above, the description has been made of the system under which the print controller 103 and the image server 102 exist independently as shown in FIG. 1. However, the present invention is also applicable to the case where the print controller 103 functions dually as the image sever 102 as shown in FIG. 15.

<The System Structure>

Figure 15:
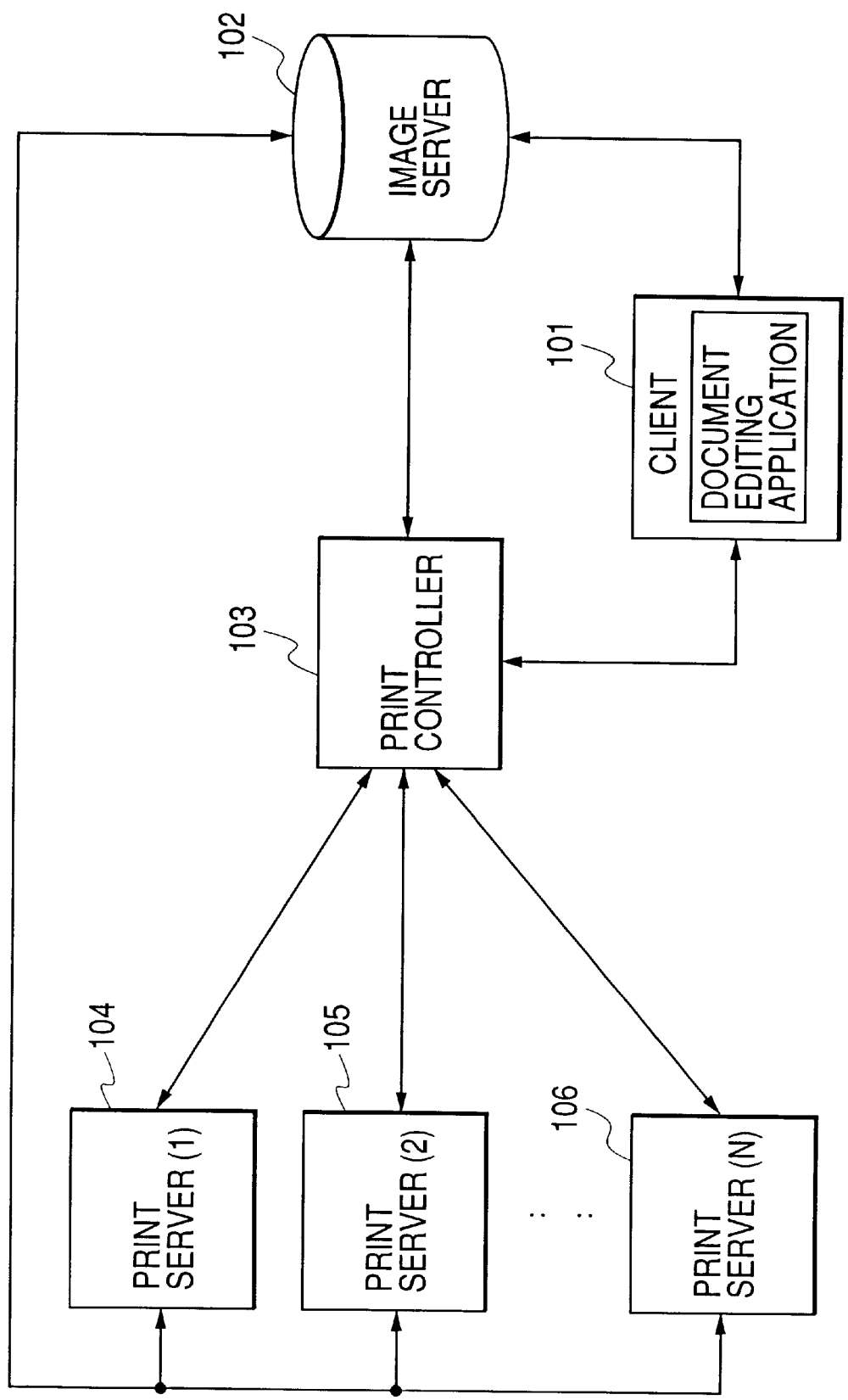
FIG. 15 is a view which shows the system structure in accordance with another embodiment of the present invention.

FIG. 15 is a view which shows the system structure in accordance with another embodiment of the print controller of the present invention.

In FIG. 15, a reference numeral 101 designates a client computer which is provided with the document editing application, and also, with the functions to produce documents including character strings, graphics, images, and other data, as well as to edit them and convert the documentary data to the page description language.

A reference numeral 103 designates a print controller, which receives from the client computer 101 the print script and print order written in the page description language, and select the print server that processes the print order, and then, transmits the print script and print order.

Further, a reference numeral 103 designates the one which is provided with the function as an image server. In other words, this one holds in a plurality of resolutions an image in the image format in which one screen is divided into a plurality of tiles for divisional controls, hence making it possible to provide through the net work the image tile data of a specified resolution within an image file.

Reference numerals 104, 105, and 106 designate print servers, which process the print script for printing in accordance with the print order received from the print controller 103.

The client computer 101 having the document editing application provided therefor, the print controller 103, and print servers 104, 105, and 106 are connected with each other through the net work.

<The Structure of Apparatuses>

FIG. 4 is a block diagram which shows the print controller 103. FIG. 5 is a block diagram which shows the print server. The block diagrams showing the structure of these apparatuses are the same as those describing the previous embodiment. However, in FIG. 4, the HDD 1009 stores the actual information of the image data required, because the print controller 103 also functions as the image server.

<The Description of the Operation>

In conjunction with FIG. 3, the description will be made of the overall operation of this system.

In conjunction with FIG. 3, the description will be made of the entire operation of this system.

The user obtains from the image server 102 the image data 303 among the image 203 of resolution 1 in the image file 201 using the function of the document editing application loaded on the client computer 101, and produces the document 302.

When the user issues the request of a print service, the document editing application loaded on the client computer 101 converts the document 302 to the script 306, and adds the print order for the preparation of a print order file, which is transmitted to the print controller 103.

The print controller 103 determines the print server 104 that executes printing by use of the print server determination means which will be described later. Then, the printing request is transmitted to the print server 104 on the bases of the script 306.

The print server 104 decodes the script 306 thus received, and obtains from the print controller 103 the image tiles data 303 in the specified resolution of the script written on the printing request. Thus, the print server executes printing by use of the printer 2012 by synthesizing the printing image of the document 302 with the other image information (304 and 305) of the script and the image tile data 303.

<The Print Controller Processing>

FIG. 6 is a flowchart which shows the process flow of a print controller 103 in accordance with the present invention.

In FIG. 6, a series of processes begins in S1 when a print order and a print script are transmitted from the document editing application loaded on the client computer 101 to the print controller 103.

The print order contains information needed for selecting a print server for the output execution (output designation information) in the format which will be described in conjunction with FIG. 7. In S2, the output designation information of the print order is analyzed.

In S3, the print server management table is updated, if necessary, in accordance with the result of the analysis made on the output designation information.

The print server management table is used for controlling the status of the print servers (104, 105, and 106) which are connected in the system so as to determine the print server that should be used for the execution of the output in accordance with the print order. (The details will be described.)

In S4, the operational status of the print server is confirmed for the one positioned at the head of the table. Then, whether or not such print server is usable is determined in S5. After that, if affirmative, the print order and print script are transmitted to the print server in S6, thus designating the image output.

In the S5, if it is determined that the executable condition of the print server is not satisfied, the print server management table is corrected and updated accordingly in S7.

When the print server management table is updated, it is determined in S8 whether or not there is any print server that may be usable in accordance with the result of such updating. If affirmative, the status of such print server is confirmed in S9, and then, the process returns to the S5.

In the S8, if the next printer server cannot be found, an error message is notified to the user in S10 or required means is taken for dealing with any abnormal processing. Then, the series of the processes terminates.

<The Print Server Processing>

The print server 104 and others create the output images in compliance with the printing request that includes the print order and print script processed and transmitted by and from the print controller 103. Then, the print server outputs images to the printer 2012 connected with it.

If image information is contained in the print script that has been transmitted, the required image tiles and image data are directly obtained from the print controller 103 on the basis of such information. Then, when the output image is created, it is synthesized to contain such image data and image tiles, and the image thus created is output to the printer 2012.

At this juncture, the image data and image tiles that have been used are held on the HDD 2009 of the print server for a specific period of time. If a printing is requested for the image output for which the same image data and image tiles should be used within such specific period of time, it becomes possible to lighten the burden given to transmitting the image data and image tiles again from the print controller 103 by use of the image data and image tiles, which are thus held on the HDD last time.

<The Print Order>

FIG. 7 is a view which schematically shows the print order format to be transmitted to the print controller 103 from the client computer 101 which is provided with the document editing application for the client who requests the image output.

In FIG. 7, a series of information at 401 to 411 are transmitted to the print controller 103 together with the print script as information required for printing.

In FIG. 7, a reference numeral 401 designates parameters that indicate the individual identification information, and 402 that follows it indicates the data length (data size) of such individual identification information.

The individual identification information 402 are those needed for confirming the client of the image output, which contain the ID information such as the name of individual and the password, as well as the information needed for charging management fees. However, such information are not essentially important for describing the contents of the present invention. Here, therefore, none of them are referred to in detail.

Information at 403 and on are those of the output designation required for selecting the print server for the execution of image output.

The information at 403 indicates the numbers of output designation parameters in use. If the length thereof is zero, it means that the client does not designate any particular print server for image output. Then, the default print server is used for the output purpose, (which is the one on the top of the print server management table provided for the print controller).

The information at 404, 406, 408, and 410 are the parameters which may become the references of the output designation. For example, these are IDs that provide the factors for uniquely determining the print server, such as distance and image quality, among some others. In FIG. 7, the information at 404 is distance given as the parameter 1; 406, output time as the parameter 2; and 408, print quality as the parameter 3, for example.

The information at 410 indicates that the parameters are prepared in N numbers. Therefore, the numbers of the output designation parameters are given as N at 403.

Also, at 405, 407, 409, and 411, each numerical value (priority) is shown to indicate the priority of each of the parameters 1, 2, 3, and N. Here, the priority of each parameter is not dependent upon the arrangement order within the data, but it is determined correlatively in accordance with the order of priority of each of them.

However, if the priorities are equal, the order of priority is determined in accordance with the procedures established for the purpose of making such determination within the print controller. As a result, the order of priority cannot be ascertained only in accordance with the information given here.

In this respect, it is unnecessary to provide such information of output designation for the print order which is transmitted from the print controller 103 to the print server 104 or others. Therefore, not all the print orders contain the information of the kind.

<The Print Server Management Table>

FIG. 8 is a view which schematically shows the format of the print server management table to be controlled within the print controller.

For this table, there is recorded the frequency of each of the parameters, which is related to all the print servers connected within the system. Depending upon the value of such frequency, the preference of print servers is determined.

In FIG. 8, a reference numeral 501 designates the line that indicates the parameter values of the print server 1, for example. On this line, the frequencies are recorded for the parameters 1, 2, and N.

Each line on the table means each of the parameters. In FIG. 8, reference numerals 502, 503, and 504 means the parameter 1, parameter 2, and parameter N, respectively, for example.

The same line as at 501 is prepared for each of the print servers (in FIG. 8, these are prepared in M numbers). At 505, the line is for the print server 2; 506, the print server 3; and 507, the print server M, respectively.

For the table, numerical values are recorded with respect to each of the printer servers and parameters. For example, at 508, the P(1, 1) is the value that indicates the numerical value of the parameter 1 for the print server 1. At 509, the P(M, N) is the value that indicates the numerical value of the parameter N for the print server M. Between print servers, these values are compared for each of the lines to compare the preferences of certain parameter.

For this table, the order of print server lines is assumed to be in agreement with the preference order of the print server that executes image output. (In other words, the order of priority is assumed to be the order of 1, 2, 3, . . . , N in FIG. 8.) Therefore, when the parameter frequency of each print server changes, the order of lines on the table is corrected as required.

Also, the preference of each print server is changed and determined in accordance with the order of priority of the parameters provided by the information of output designation (see FIG. 7). In this case, too, the line order for the table is corrected again.

Here, the print server management table is stored on the hard disc 1009 shown in FIG. 4, and developed on the RAM 1002 for use.

<The Correction Example 1 of the Print Server Management Table>

FIG. 9 is a view which schematically shows the state where the print server management table represented in FIG. 8 is being updated.

In FIG. 9, a reference numeral 601 designates the print server management table before having been updated; and 602, the state where the table is updated.

At 603, 604, and 605, the lines indicate each of the statuses of print servers 1, 2, and 3. At 606, the line indicates the status of the parameter 1. Here, the parameter 1 which is at the uppermost position is assumed to be the parameter having the top priority.

Now, assuming that the frequencies of the parameter 1 are P(1, 1) (607), P(2, 1) (608), P(3, 1) (609), respectively, with respect to the print servers 1, 2, and 3, these values are compared. For example, if there is a relationship between these values as shown below, $$P(3, 1) > P(1, 1) > P(2, 1) \qquad \text{(formula 1)}$$

the table is modified to correct the order to be 605, 603, and 604 as indicated at 602 in accordance with the order of priority.

In this way, the print server management table changes at any time depending on the changes of the parameter frequencies of each print server.

FIG. 10 is a flowchart which shows the process flow in which the print server management table is being changed as described above.

In FIG. 10, the contents of the table should be changed for some reasons in S1. It is caused by the process in the S3 or S7 in FIG. 6, for example.

In S2, the orders of priorities are compared for each of print servers with respect to the most significant parameter on the basis of the information contained in the management table.

In S3, if any updating is required for the management table as the result of such comparison, the table is updated.

Usually, the updating of the table terminates at this point, but if there are the print servers having the same priority order, the following processes are executed in continuation:

In S4, it is examined if there any print servers having the same priority order. If negative, the process terminates.

If affirmative, the examination is made in S5 to find whether or not there are still any parameters remaining unused for comparison.

If any unused parameters are found, the comparison is made in S6 for determining the order of priority of the server on the basis of such parameters thus found. Then, the process returns to the S3.

In the S5, if no parameters are found to be unused, there is no way to carry out any comparison. Therefore, the updating of the table terminates while the serves having the same order remain unchanged in the status before updating.

<The Correction Example 2 of the Print Server Management Table>

FIG. 11 is a view which schematically shows the state where the print server management table is being updated when the order of priority of parameters is changed in accordance with the output designation information contained in the print order represented in FIG. 7, and also, updated when any different order of priority is required in accordance with the output designation information.

In FIG. 11, a reference numeral 701 designates the print server management table before having been updated and 702, the state of the table after updating.

Reference numerals 703 and 704 designate the status of the print servers 1 and 2, respectively, and 705, that of the parameter 2.

Here, it is assumed that the output designation information is received to give priority to the parameter 2, while the parameter 1 is being given priority within the print server management table, and the table currently represents the status that corresponds to the condition of the parameter 1.

Now, assuming that the frequencies of the print servers 1 and 2 with respect to the parameter 2 are P(1, 2) (706), P(2, 2) (706), the conditions within the line 705 that includes these values are compared in order to determine the order of priority for the parameter 2. For example, if the values are in the relationship of:

$$P(2, 2) > P(1, 2) \qquad \text{(formula 2)}$$

the table changes in accordance with the order of priority to modify the order as at 702.

The flow of the processes described above is substantially the same as those described in the flowchart shown in FIG. 10. Therefore, no description will be made with the provision of any particular new flowchart.

In FIG. 10, after factors take place for changing the table in S1, the print server management table is updated in accordance with the order of priority designated in the print order.

After that, the processes in S2 and on in FIG. 10 are executed.

<In a Case Where the Comprehensive Aspect is Introduced into the Method for Determining the Order of Priority>

The method for determining the order of priority of the print servers described in conjunction with FIG. 9 and FIG. 11 is such that each of the parameters is handled individually to define the parameter having the higher priority as absolute condition. However, when this method is generally practiced for execution, it may be possible to determine the orders of the plural parameters by the application of the comprehensive evaluation thereof, not defining each individual parameter as its factors for making determination.

FIG. 12 is a view which schematically shows the print server management table when it is used for the comprehensive evaluation.

In FIG. 12, each of the lines at 801, 802, 803, and 804 records each of the print servers 1, 2, 3, and M, and the comprehensive evaluation, respectively. Here, it is assumed that the numbers of print servers usable within the system are M in total.

Each of the lines at 805, 806, and 807 records the order of priority for each of the print servers with respect to the parameters 1, 2, and N, respectively. In this respect, it is assumed that the number of parameters are N in total.

Here, P(M, N) at 808 indicates the order of priority for the parameter N of the print server M.

The line at 809 records the comprehensive evaluation of the print servers, which is calculated on the basis of all the parameters. A reference numeral 810 designates the score of the comprehensive evaluation of the print server 1.

Here, it is assumed that the print servers on each of the lines are arranged from the top to bottom in accordance with the larger scores of the comprehensive evaluation thereof. Therefore, when the print order is received, the output is tried one after another from the print servers having the higher comprehensive evaluation corresponding to this table.

Conceivably, the method for calculating the score of the comprehensive evaluation is as follows, for example:

A coefficient is set corresponding to the higher priority of each of the parameters, and the score of the comprehensive evaluation is the sum obtainable by multiplying the priority of each print server of each parameter by this coefficient.

In other words, given the coefficient of the parameter N as A(N), this can be expressed in the following formula:

$$Q(M) = A(1)*P(M, 1) + A(1)*P(M, 1) + \ldots + A(N)*P(M, N) \qquad \text{(formula 3)}$$

Here, the coefficient A(M, N) is defined as fixed, but it may be made variable in accordance with the status of the system and the contents of a print order.

<The Loading of Program from a Medium)

FIG. 13 is a view which shows one example of the memory map of the program for the print controller, which is stored on an external storage medium (a floppy disc or other removable disc).

In FIG. 13, a reference numeral 999 designates the region where the directory information is stored, which indicates the storage location 998 of the print controller program that follows it.

Also, the region 998 indicates the storage location 997 of the print server management table to be used for this program.

The print controller program is installed by reading out the stored program from the location 998 of this memory map, and loaded on the RAM 1002.

At this juncture, the print server management table is loaded on the RAM 1002 from the location 997 and used for the program during its processing.

FIG. 14 is also a view which shows one example of the memory map of the program of a print server stored on the external storage medium (a floppy disc or other removable disc).

In FIG. 14, a reference numeral 1999 designates the region where the directory information is stored, which indicates the storage location 1998 of the print server program that follows it.

On the FDD 2010, the print server program is installed by reading out the stored program from the location 1998 of the memory map, and loaded on the RAM 2002 to make it executable.

<The Block Diagram of an Image Server>

Figure 21:
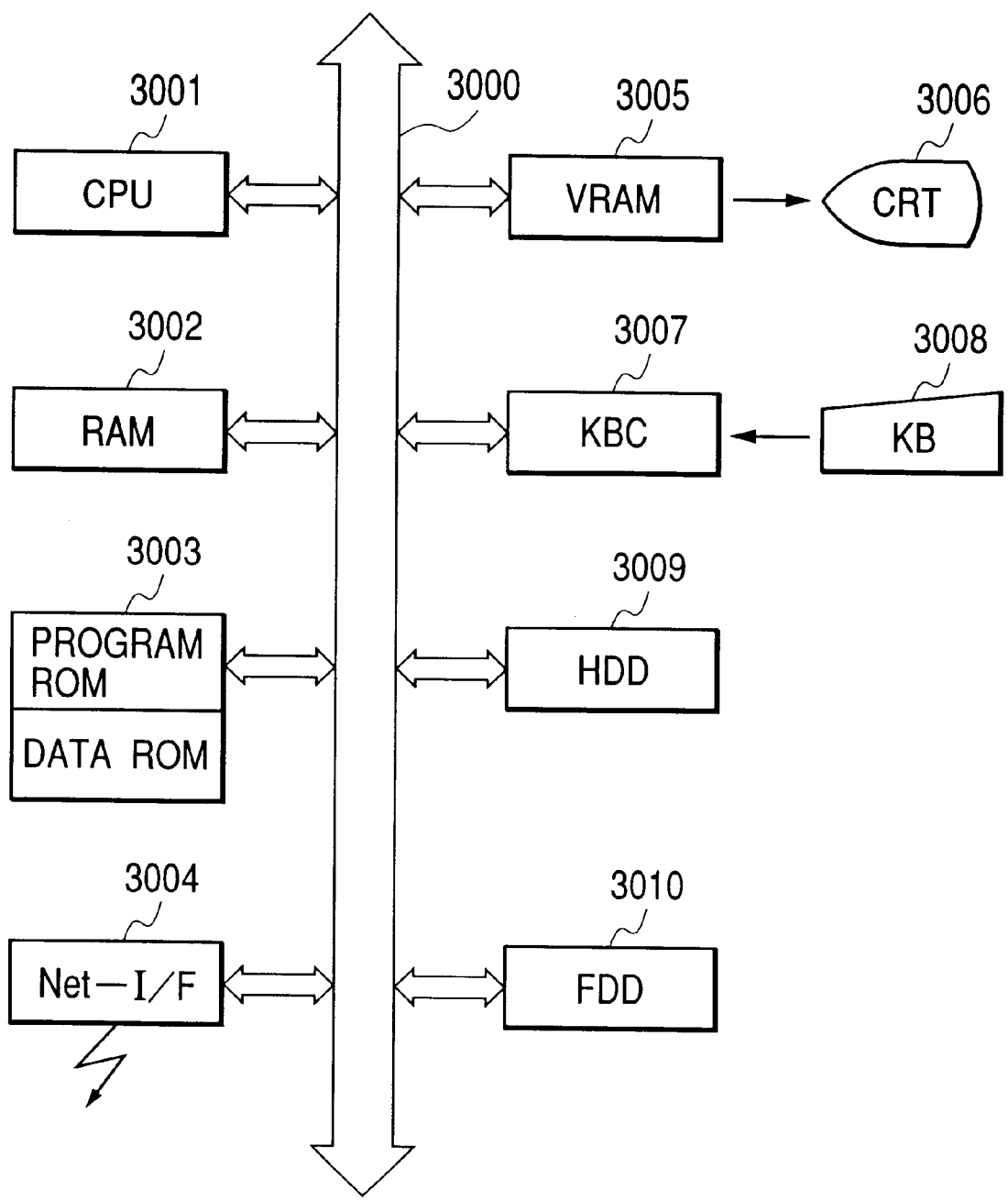
FIG. 21 is a block diagram which shows the system structure of the image server to be used for the present invention.

FIG. 21 is a block diagram which shows the system structure of an image server.

Figure 23:
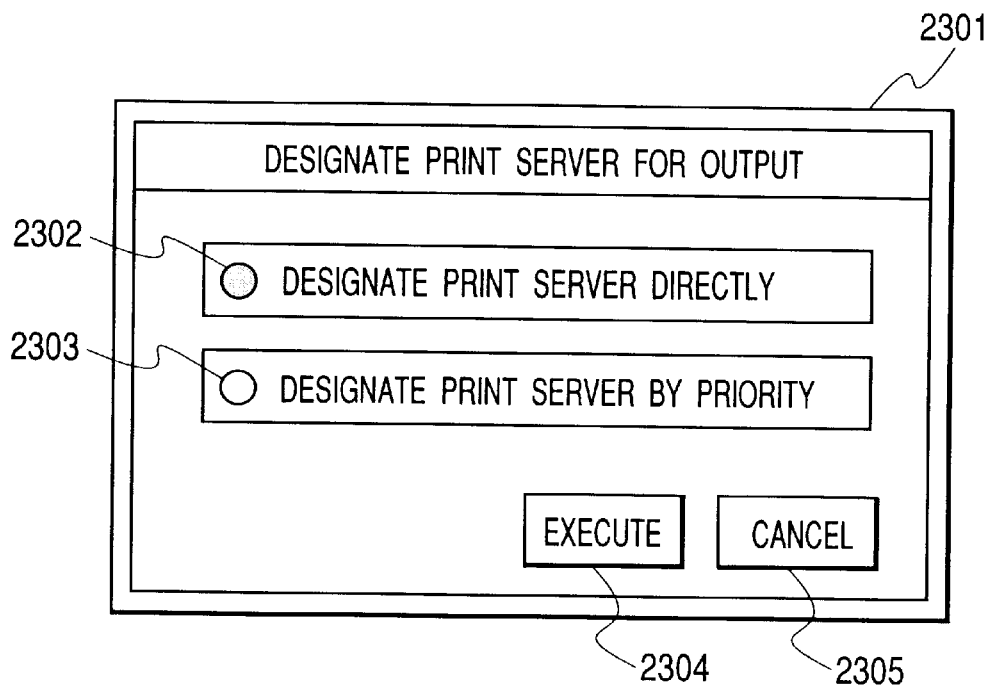
FIG. 23 is a view which shows one example of the user interface screen that displays printing instructions from the client.

In FIG. 23, a reference numeral 3001 designates a CPU that controls the entire body of this apparatus.

A reference numeral 3002 designates a RAM that functions as provisional storage means. The RAM 3002 serves as the main memory of the CPU 3001, as well as functions as the work area and the provisional save area for the execution of programs stored in a ROM 3003.

A reference numeral 3003 designates the ROM that stores the operational process procedures of the CPU 3001. The ROM 3003 comprises a program ROM that stores the system program (show in FIG. 16 and FIG. 17) to control the devices of the print service controller and a data ROM that stores information and others required to operate the system.

A reference numeral 3004 designates the net work interface (Net-I/F) that functions as external transmission and reception means. The net work interface 3004 performs the data control and diagnosis for the data transmission and reception through the net work system (internet or the like), and controls data transmission and reception to and from the client and the print server, which will be described later.

A reference numeral 3005 designates a video RAM (VRAM) that functions as storage means for display use. The video RAM 2005 develops images to be displayed on the screen of a CRT 3006 that functions as display means for indicating the operational status of the system, and controls such indication.

A reference numeral 3007 designates a keyboard controller that controls the input signals from the keyboard and other external input devices. A reference numeral 3008 designates an external input device that accepts operations. Generally, it is a keyboard, a pointing device (mouse) or the like.

A reference numeral 3009 designates a hard disc drive (HDD) that functions as storage means, which is used for holding application programs to be described later, and data on image information.

A reference numeral 3010 designates a removable disc drive (FDD) such as a floppy disc that functions as external storage means, which is used for reading out from the medium of application program to be described later.

A reference numeral 3000 designates I/O buses (address bus, data bus, and control bus) that connect each of units described above.

<The Process Flow of the Image Server>

Figure 16:
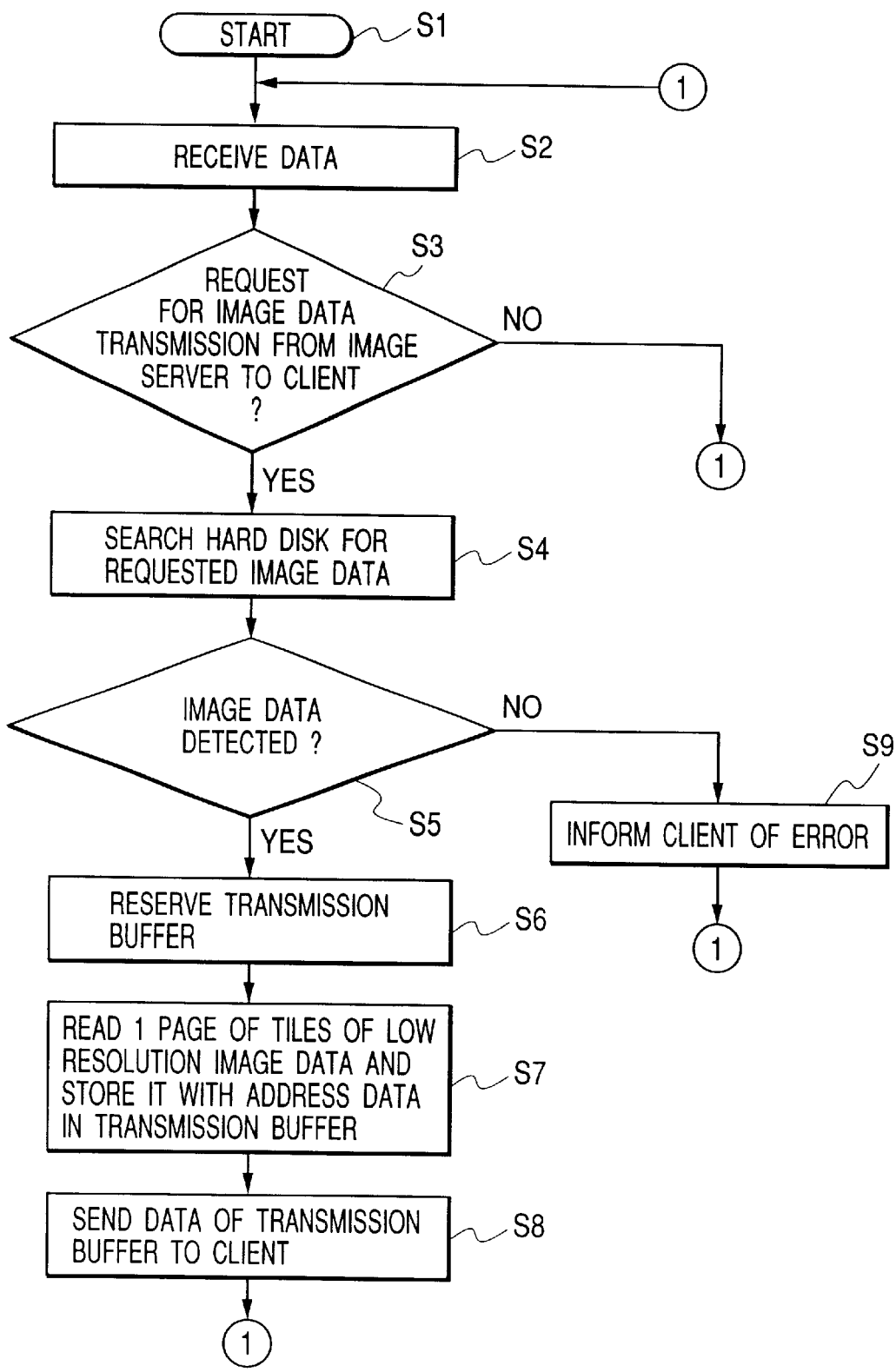
FIG. 16 is a flowchart which shows the processing of an image server 102 in accordance with a request from a client (at 101 in FIG. 1).
Figure 17:
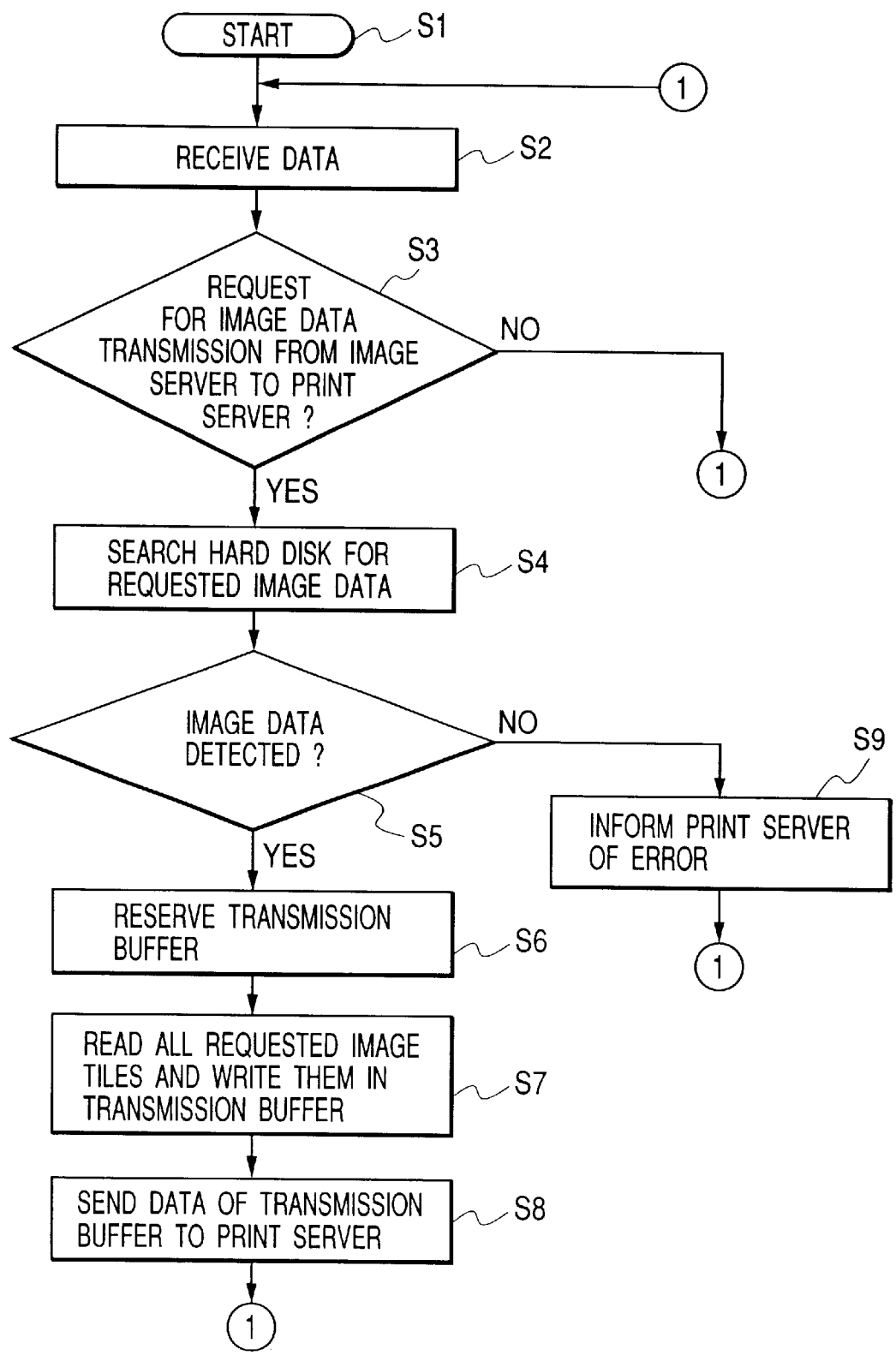
FIG. 17 is a flowchart which shows the processing of the image server 102 in accordance with requests from the print servers 104 to 105.

FIG. 16 and FIG. 17 are flowcharts which illustrate the process flow of the image server (at 102 in FIG. 1) in accordance with the present invention.

FIG. 16 is a flowchart which shows the processing of the image server 102 in compliance with the request from the client (at 101 in FIG. 1).

In FIG. 16, when the processing of the image server 102 begins in S1, the preparation for the image server 102 is made. Then, it becomes possible to receive the data transmission request from the client 101 and the print servers (104 to 106). In S2, with the reception of certain data, its analysis is made in S3 and on.

In S3, if the reception contains any image data transmission to the client 101, the processes in S4 and on are executed. Otherwise, the other processing is conducted, and then, the process returns to S2. Here, however, no reference is made to the other processing. If the content of the reception is the client's request, the image data requested in S4 are retrieved from the hard disc 3009.

In S5, if there is no image data as requested, an error message is given to the client 101 in S9. The process returns to S2 to wait for the next reception.

At this juncture, the client 101 indicates the warning message on its display screen or takes some required steps to deal with the case where no image data are available.

If the image file exists, buffers for transmission use are secured on the memory 3002 so as to make data transmission ready.

In S7, one page portion of the image tiles of a lower resolution is read from such image file in S7 for use of editing at the client 101, and written on the buffers secured in the S6 to be ready for transmission.

Since the image file is under management separately for each of the resolutions as described in conjunction with FIG. 2, it is easy to obtain the image tiles of the required resolution from among those kept in the image files.

Also, in the S7, the so-called identifier such as represented by the internet address, which uniquely indicates the image file needed, is also written on the transmission buffers at the same time.

This address is used as means for identifying the image file among the script 306 described in conjunction with FIG. 3.

Here, in this stage of the S7, it is unnecessary for the image server 102 to designate the image tile ID of the information used for the script, because the tiles are determined for use only when the editing process takes place at the client 101.

When the writing of the information on the transmission buffers is completed, the data are transmitted to the Client in S8. Then, the process returns to the S2 to wait for the next reception.

FIG. 17 is a flowchart which shows the processing of the image server 102 for the requests from the print servers 104 to 106.

In FIG. 17, when the processing of the image server 102 begins in S1, the preparation for the image server 102 is made. Then, it becomes possible to receive the data transmission request from the client 101 and the print servers (104 to 106).

In S2, with the reception of certain data, its analysis is made in S3 and on.

In S3, if the reception contains any image data transmission to the print servers 104 to 106, the processes in S4 and on are executed. Otherwise, the other processing is conducted, and then, the process returns to S2. Here, however, no reference is made to the other processing. If the content of the reception is the requests from the print servers 104 to 106, the image data requested in S4 are retrieved from the hard disc 3009.

In S5, if there is no image data as requested, an error message is given to the print servers 104 to 106 in S9. The process returns to S2 to wait for the next reception. At this juncture, the print servers 104 to 106 transmit to the client 101 the warning message or take some required steps to deal with the case where no image data are available.

If the image file exists, buffers for transmission use are secured on the memory 3002 so as to make data transmission ready.

Then, in S7, all the image tiles of requested resolutions and IDs are read from such image file in S7 and written on the buffers secured in the S6 to be ready for transmission.

Since the image file is under management separately for each of the resolutions as described in conjunction with FIG. 2, it is easy to obtain the image tiles of the required resolution from among those kept in the image files.

When the writing of the information on the transmission buffers is completed, the data are transmitted to the print servers 104 to 106 in S8. Then, the process returns to the S2 to wait for the next reception.

<The Program Loading from a Medium>

Figure 18:
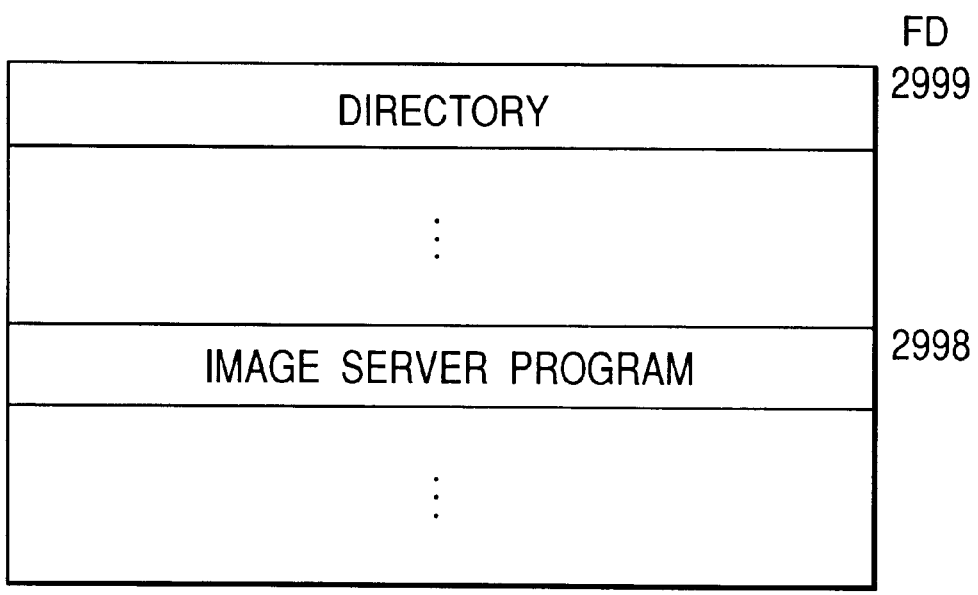
FIG. 18 is a view which shows one example of a memory map in the external storage medium (a removable disc such as a floppy disc) that stores programs of the image server 102.

FIG. 18 is a view which shows one example of the memory map on the external storage medium (a floppy disc or some other removable disc) that stores the program of the image server 102.

In FIG. 18, a reference numeral 2999 designates the region where the directory information is stored, and which indicates the storage location 2998 where the program of the image server 102 to follow it is stored.

The program of the image server 102 is read out for installation from the program location 2998 of the memory map on the FDD 3010, and loaded on the RAM 3002 to make it executable.

Now, the description will be made of the structure of the printing unit of the image reproduction system which is applicable to the present embodiment.

Figure 19:
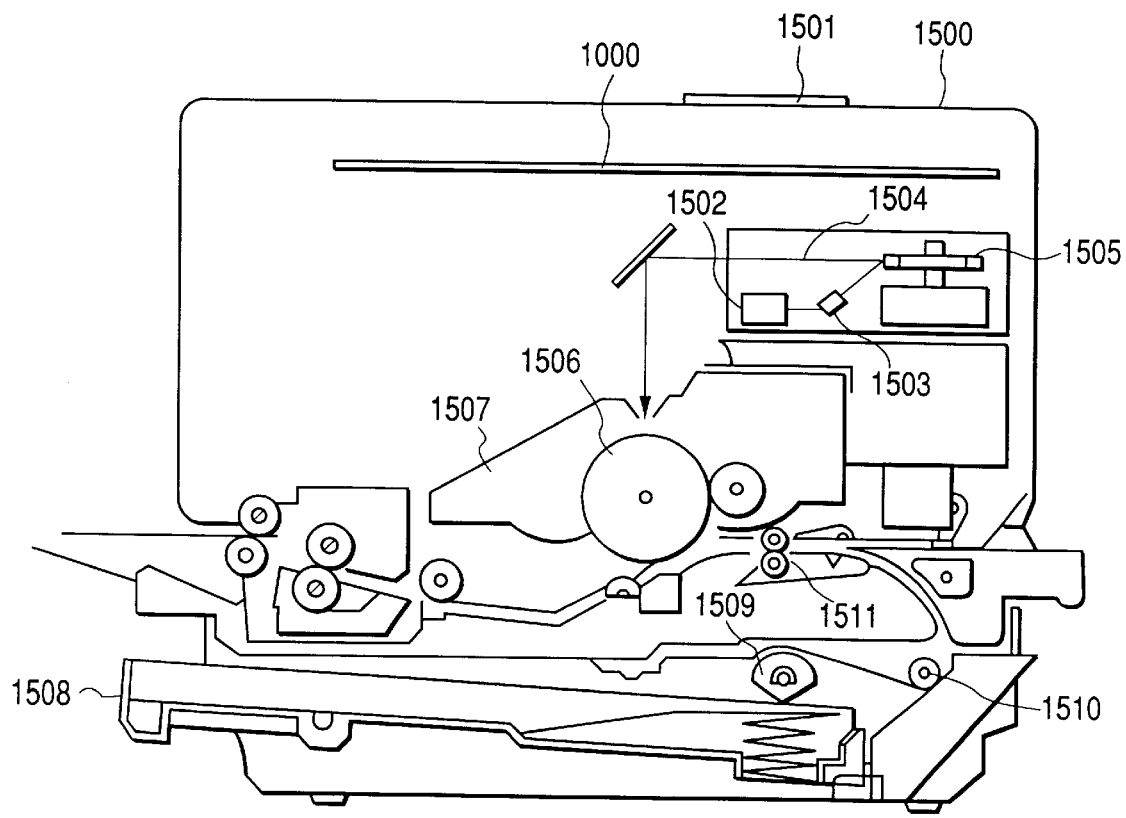
FIG. 19 is a view which shows the structure of a printer usable for the present embodiment.
Figure 20:
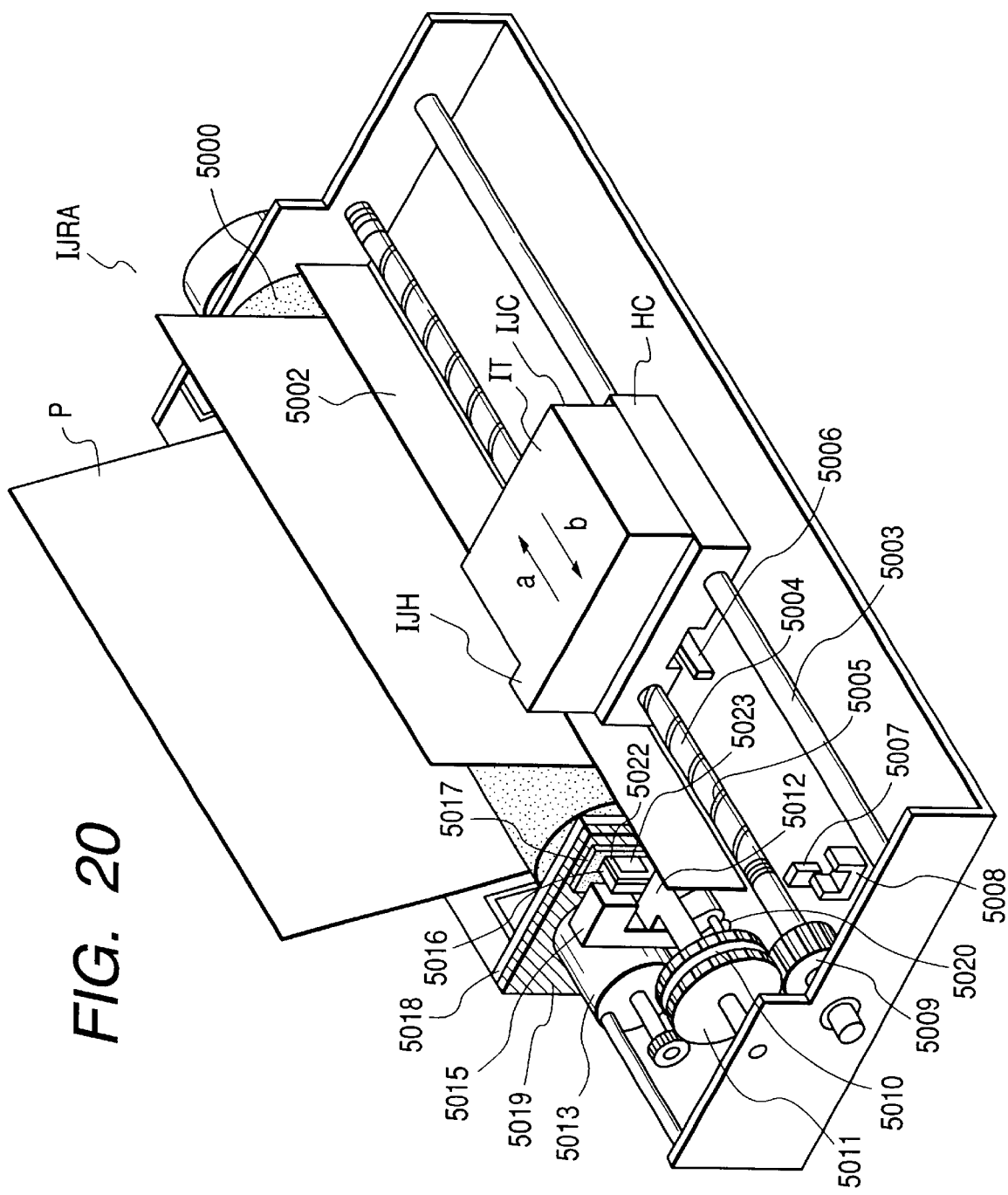
FIG. 20 is a view which shows the structure of a printer usable for the present embodiment.

With reference to FIG. 19 and FIG. 20, the description will be made of the structures of a laser beam printer and an ink jet printer, which are applicable to the present embodiment. In this respect, the printers which are applicable to the present embodiment are not necessarily limited to the laser beam print and ink jet printer. It is of course possible to use printers of any other types.

FIG. 19 is a cross-sectional view which shows the structure of a first recording apparatus which is applicable to the present invention. It is, for example, a laser beam printer (LBP).

In FIG. 19, a reference numeral 1500 designates the LBP main body (printer), which inputs and stores the printing information (character codes and others), form information, macro commands, or the like, supplied from the externally connected host computer, and then, produces character patterns, form patterns, or the like to form images on a recording sheet which serves as a recording medium.

A reference numeral 1000 designates a printer control unit that controls the LBP main body as a whole and analyzes the character information and others supplied from the host computer. The printer control unit 1000 converts the character patters corresponding mainly to the character information into the video signals, and outputs them to the laser driver 1502.

The laser driver 1502 is a circuit that drives the semiconductor laser 1503, and switch on and off the laser beam 1504 which is emitted from the semiconductor laser 1503 in accordance with the inputted video signals.

The laser beam 1504 is oscillated in the left and right directions by means of a rotary polygon mirror 1505 to scan and cause exposure on the electrostatic drum 1506. In this way, the electrostatic latent images of the character patterns are formed on the electrostatic drum 1506. The latent images are developed by means of the development unit 1507 arranged on the circumference of the electrostatic drum 1506. After that, the developed images are transferred to the recording sheet. For this recording sheet, a cut sheet is used. Cut sheets for recording use are housed in a sheet cassette 1508 mounted on the LBP main body 1500, which are fed in one by one into the interior of the apparatus by means of a feed roller 1509, and carrier rollers 1510 and 1511, and supplied onto the electrostatic drum 1506. In this respect, it may be possible to execute output in colors with the same structure as described above.

FIG. 20 is an external view which shows the structure of a second recording apparatus which is applicable to the present invention. It is, for example, an ink jet recording apparatus (IJRA).

In FIG. 20, a carriage HC engages with the spiral groove 5004 of a lead screw 5005 which rotates through the driving force transmission gears 5011 interlocked with the driving motor 5013 which rotates regularly and reversely. This carriage is provided with a pin (not shown), and allowed to reciprocate in the directions indicated by arrows a and b through the guide rail 5003. There is mounted on the carriage HC an ink jet cartridge IJC which is provided with an ink tank IT and an ink jet head IJH. A reference numeral 5002 designates a sheet pressure plate which presses the sheet to a platen 500 all over in the traveling direction of the carriage. Here, the head is capable of outputting images in colors. Also, the driving of the head is not necessarily limited only to a certain type, such as piezo, air flow, or sublimation type.

Reference numerals 5007 and 5008 designate a photocoupler to confirm the presence of the carriage lever 5006 in the zone where the coupler is installed, and functions as home position detection means for swathing over the rotational directions of the driving motor 5013. A reference numeral 5016 designates a capping member 5022 that caps the entire surface of the recording head; 5015, suction means to suck the interior of this cap for the execution of suction recovery of the recording head by way of the aperture 5023 in the cap; 5017, a cleaning blade which is movable in the forward and backward directions by means of a member 5019; 5018, a supporting plate for the main body that supports the cleaning blade 5017 as well as the member 5019; 5012, a lever that enables sucking to begin for the suction recovery. It is arranged to move the lever along the movement of a cam 5020 that engages with the carriage, and the driving force from the driving motor 5013 is controlled by swathing over of the clutch or any other known transmission means.

These capping, cleaning, and suction recovery means are structured so that a desired process is carried out in corresponding positions by the function of the lead screw 5005 when the carriage comes into the region on the home position side. However, it may be possible to arrange the structure so that a desired operation is conducted at know timing.

As described above, it is made possible to supply the program of the image output control from the information storage medium to the image reproduction system or it is made possible to access the information storage medium directly for execution. Thus, the image reproduction system of the present invention can easily control the image output by means of the image output control program that corresponds to each of the recorded formats, irrespective of the information storage media in which recording is made in different and plural formats. With such control, it is possible for the present invention to meet the requirement of the image output control corresponding to all the formats.

Also, since the image format and the corresponding output control program are supplied from the same information storage medium, this system is able to set up itself automatically in accordance with the corresponding operation required for the image format of such information storage medium. Therefore, it is unnecessary to define the operation program each time depending on the information storage medium, making it easier to perform the system in accordance with the present invention.

As clear from the above description, the present invention makes it possible to curtail the amount of information to be transmitted and the expenditures for the image output significantly. Therefore, it is also made possible to accumulate image information on the image server in advance from the image output information that contains images, and to use such image information thus accumulated thereon.

Also, it is made possible for the print controller to automatically determine the current status of the print server in accordance with the load condition of the system as a whole, as well as with the required quality and function of the image output. Therefore, the resources in the system can be utilized fully and efficiently.

Further, means for specifying the references needed for selecting the print server that outputs images is used for preparing the request information from the system user, hence making it possible to select the output apparatus flexibly in accordance with such particular request from the user.

As clear from the above description, in accordance with the present invention, the following system, print controller, image server, print server or print controlling method or apparatus, or recording medium can be provided. In other words, in accordance with the present invention, the printing control system for printing images is arranged to be provided with the image server which accumulates image data; a plurality of print servers that control the highly precise output of image data by the utilization of the image data thus accumulated on the image server; the client that designates the desired image printing; and the print controller which selects the print server for transmitting the image data from the image server prior to the printing designated by the client in accordance with the information which is different from the information that specifies the selection of each of the print servers.

Also, the printing control system that prints the image data is arranged to be provided with the image server which accumulates image data; a plurality of print servers that control the highly precise output of image data by the utilization of the image data thus accumulated on the image server; and the print controller which selects the print server for transmitting the image data from the image server prior to printing in accordance with the information which is different from the information that specifies the selection of each of the print servers.

Also, the printing control system that prints the image data is arranged to be provided with a plurality of print servers that control the highly precise output of image data by the utilization of the image data accumulated on the image server; and the print controller which selects the print server for transmitting the image data from the image server prior to printing in accordance with the information which is different from the information that specifies the selection of each of the print servers.

Also, the printing control system that prints the image data is arranged to be provided with the image server that accumulates image data; and the print controller which selects the print server for transmitting the image data from the image server prior to printing in accordance with the information which is different from the information that specifies the selection of each of the print servers.

Also, the print controller is arranged to be provided with selection means for selecting a plurality of print servers that accumulate image data; and with selection controlling means for controlling the selection of the print server to which the image data should be transmitted from the image server which has been selected by the aforesaid selection means in accordance with the information different from the information that specifies the selection of each of the print servers.

Also, the image server is arranged to be provided with transmission control means for transmitting desired images to the print server determined on the basis of the information different from the information that specifies the selection of the print server among a plurality of print servers that control the highly precise output of image data by the utilization of the image data accumulated on the image server prior to the printing of the desired images designated by the client.

Also, the printing control method is arranged to be provided with the selecting function that selects a plurality of print servers for controlling the image data output by the utilization of the image data accumulated on the image server that accumulates the image data; and with the selection controlling function that controls the selection of the print server to which the image data should be transmitted from the image server which has been selected by the aforesaid selection means in accordance with the information different from the information that specifies the selection of each of the printer servers.

Also, the printing control method is arranged to be provided with the function to receive the designation from the client that designates the printing of desired images; and with transmission controlling function for transmitting desired images to the print server determined on the basis of the information different from the information that specifies the selection of the print server among a plurality of print servers that control the highly precise output of image data by the utilization of the image data accumulated on the image server prior to the printing of the desired images.

Also, the recording medium is arranged to be provided with the selecting function that selects a plurality of print servers for controlling the image data output by the utilization of the image data accumulated on the image server that accumulates the image data; and with the selection controlling function that controls the selection of the print server to which the image data should be transmitted from the image server which has been selected by the aforesaid selection means in accordance with the information different from the information that specifies the selection of each of the printer servers.

Also, the recording medium is arranged to be provided with the function to receive the designation from the client that designates the printing of desired images; and with transmission controlling function for transmitting desired images to the print server determined on the basis of the information different from the information that specifies the selection of the print server among a plurality of print servers that control the highly precise output of image data by the utilization of the image data accumulated on the image server prior to the printing of the desired images.

Also, for the printing control system that prints image data, the printing control apparatus is arranged to be provided with the image server which accumulates image data; a plurality of print servers that control the highly precise output of image data by the utilization of the image data thus accumulated on the image server; the client that designates the printing of desired images; and the print controller which selects the print server for transmitting the image data from the image server prior to printing in accordance with the information which is different from the information that specifies the selection of each of the print servers.

Also, for the printing control system that prints image data, the printing control apparatus is arranged to be provided with the image server which accumulates image data; a plurality of print servers that control the highly precise output of image data by the utilization of the image data thus accumulated on the image server; and the print controller which selects the print server for transmitting the image data from the image server prior to printing in accordance with the information which is different from the information that specifies the selection of each of the print servers.

Also, for the printing control system that prints image data, the printing control apparatus is arranged to be provided with a plurality of print servers that control the highly precise output of image data by the utilization of the image data accumulated on the image server; and the print controller which selects the print server for transmitting the image data from the image server prior to printing in accordance with the information which is different from the information that specifies the selection of each of the print servers.

Also, for the printing control system that prints image data, the printing control apparatus is arranged to be provided with the image server that accumulates image data; and the print controller which selects the print server for transmitting the image data from the image server prior to printing in accordance with the information which is different from the information that specifies the selection of each of the print servers.

Also, it becomes possible to provide the print server which is provided with the page description language to be transmitted from the print controller; means for synthesizing images that synthesizes images again for its outputting on the basis of the image tiles to be transmitted from the aforesaid image server; and means for outputting the images thus synthesized by the aforesaid means for synthesizing images.

Third Embodiment

For a third embodiment of the present invention, the description will be made of the function of the client computer 101, which is one embodiment of the information processing apparatuses of the present invention, and which designates the print server that outputs images or defines the condition that determines the print server.

<The System Structure>

The structural view of the system that represents a third embodiment of the system that executes the printing control in accordance with the present invention is the same as FIG. 1 which is the structural view of the system in accordance with the first embodiment hereof.

<The Block diagram of the Client Computer>

Figure 22:
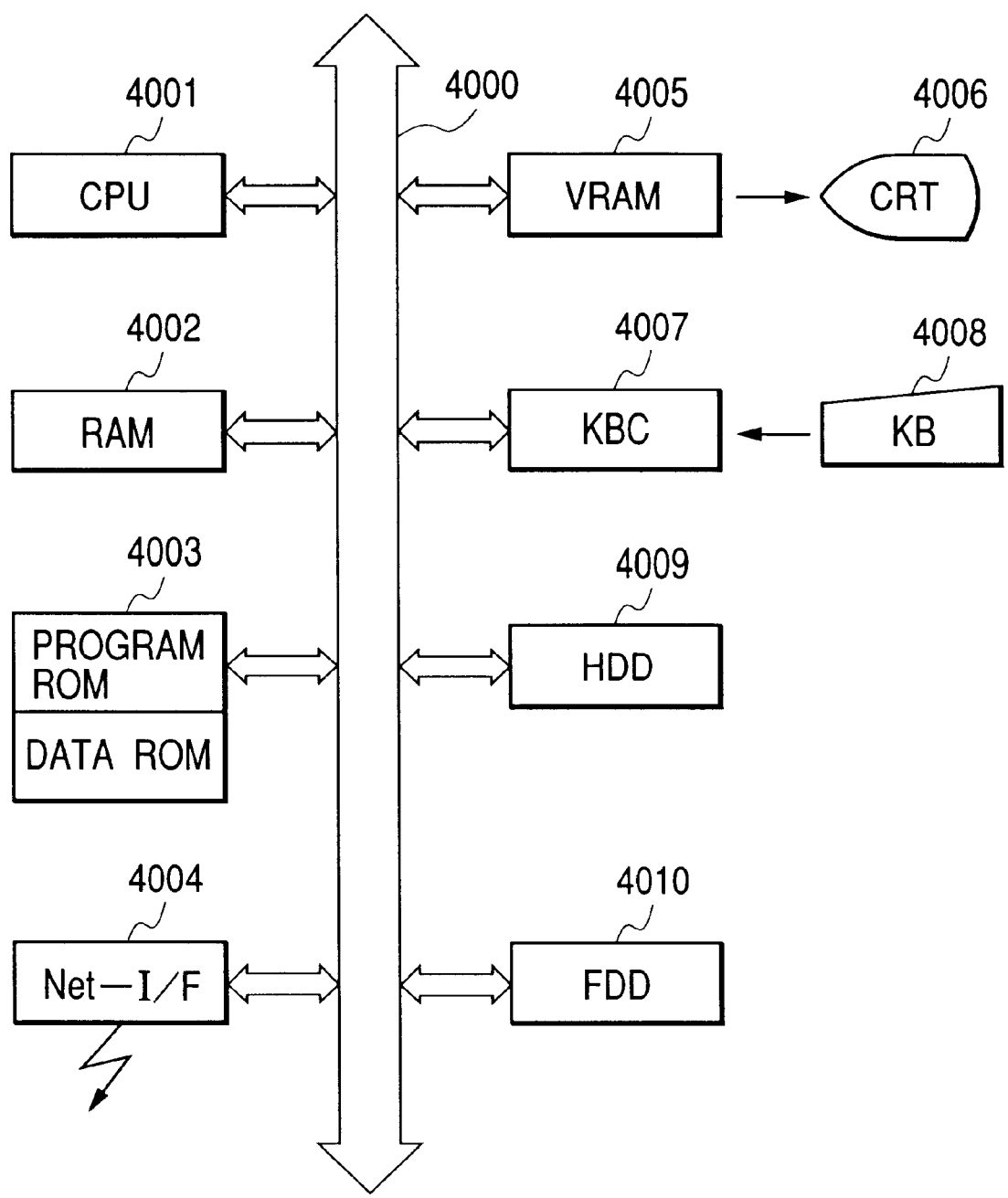
FIG. 22 is a block diagram which shows the system structure of a client computer to be used for the present invention.

FIG. 22 is a block diagram which shows the system structure of the client computer.

In FIG. 22, a reference numeral 4001 designates a CPU that controls the entire body of the apparatus. The CPU 4001 functions as control means for controlling each of the structures.

A reference numeral 4002 designates a RAM that functions as provisional storage means. The RAM 4002 serves as the main memory of the CPU 4001, as well as functions as the work area and the provisional save area for the execution of programs stored in a ROM 1003.

A reference numeral 4003 designates the ROM that stores the operational process procedures of the CPU 4001. The ROM 4003 comprises a program ROM that stores the system program to control the devices of the client computer and a data ROM that stores information and others required to operate the system. Also, on the program ROM, the document editing application program is stored.

A reference numeral 4004 designates the net work interface (Net-I/F) that functions as external transmission and reception means. The net work interface 4004 performs the data control and diagnosis for the data transmission and reception through the net work system (internet or the like) that controls data transmission and reception to and from the print server that will be described later, as well as connects this system with the user terminals.

A reference numeral 4005 designates a video RAM (VRAM) that functions as storage means for display use. The video RAM 4005 develops images to be displayed on the screen of a CRT 4006 that functions as display means for indicating the operational status of the system, and controls such indication.

A reference numeral 4007 designates a keyboard controller that controls the input signals from the keyboard and other external input devices. A reference numeral 4008 designates an external input device that accepts operations. Generally, it is a keyboard, a pointing device (mouse) or the like.

A reference numeral 4009 designates a hard disc drive (HDD) that functions as storage means, which is used for holding the control programs (FIG. 27 and FIG. 28) which will be described later, the application programs, and the data on image information.

Figure 27:
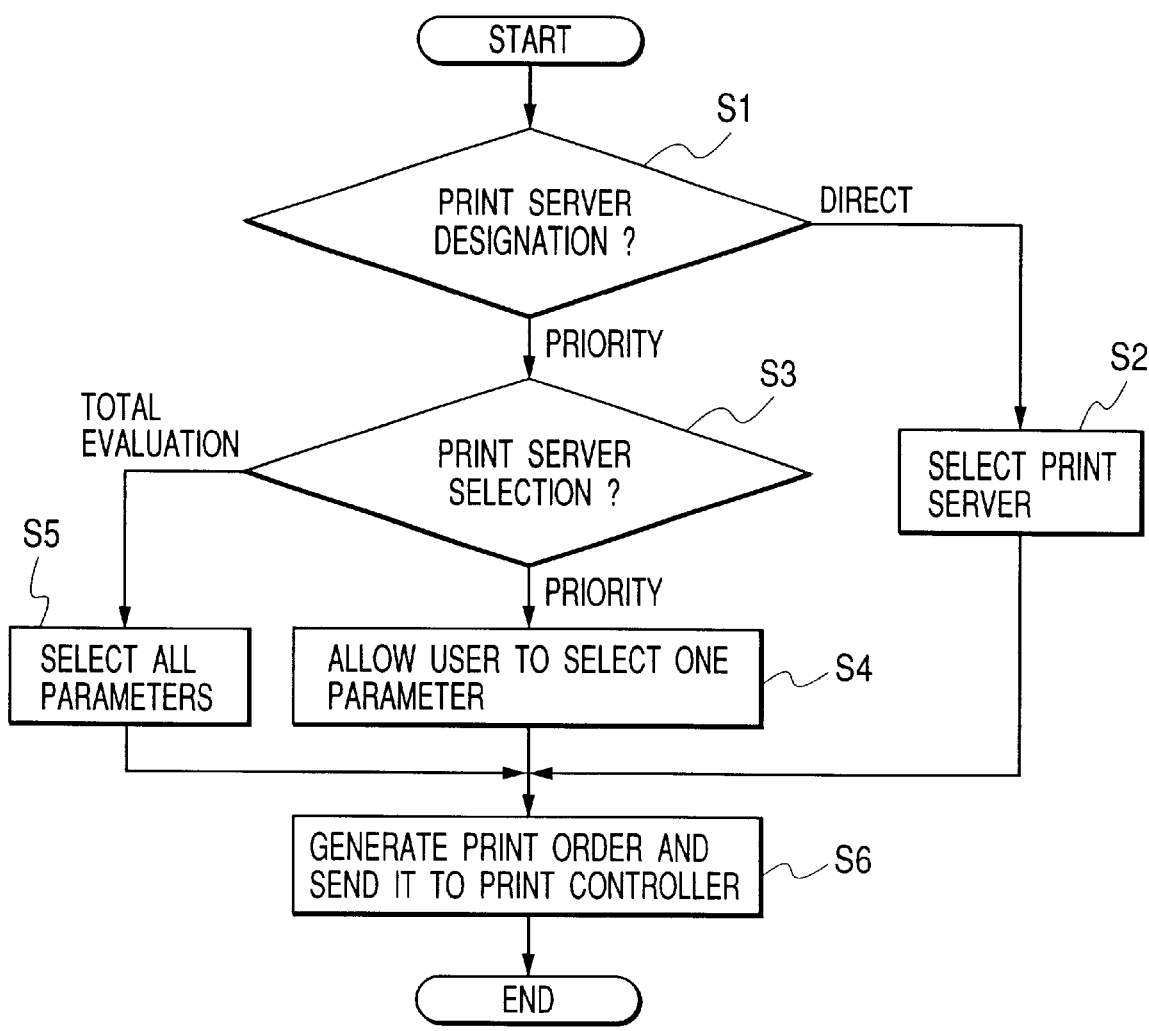
FIG. 27 is a flowchart which shows the processing of a printing request on the client side.
Figure 28:
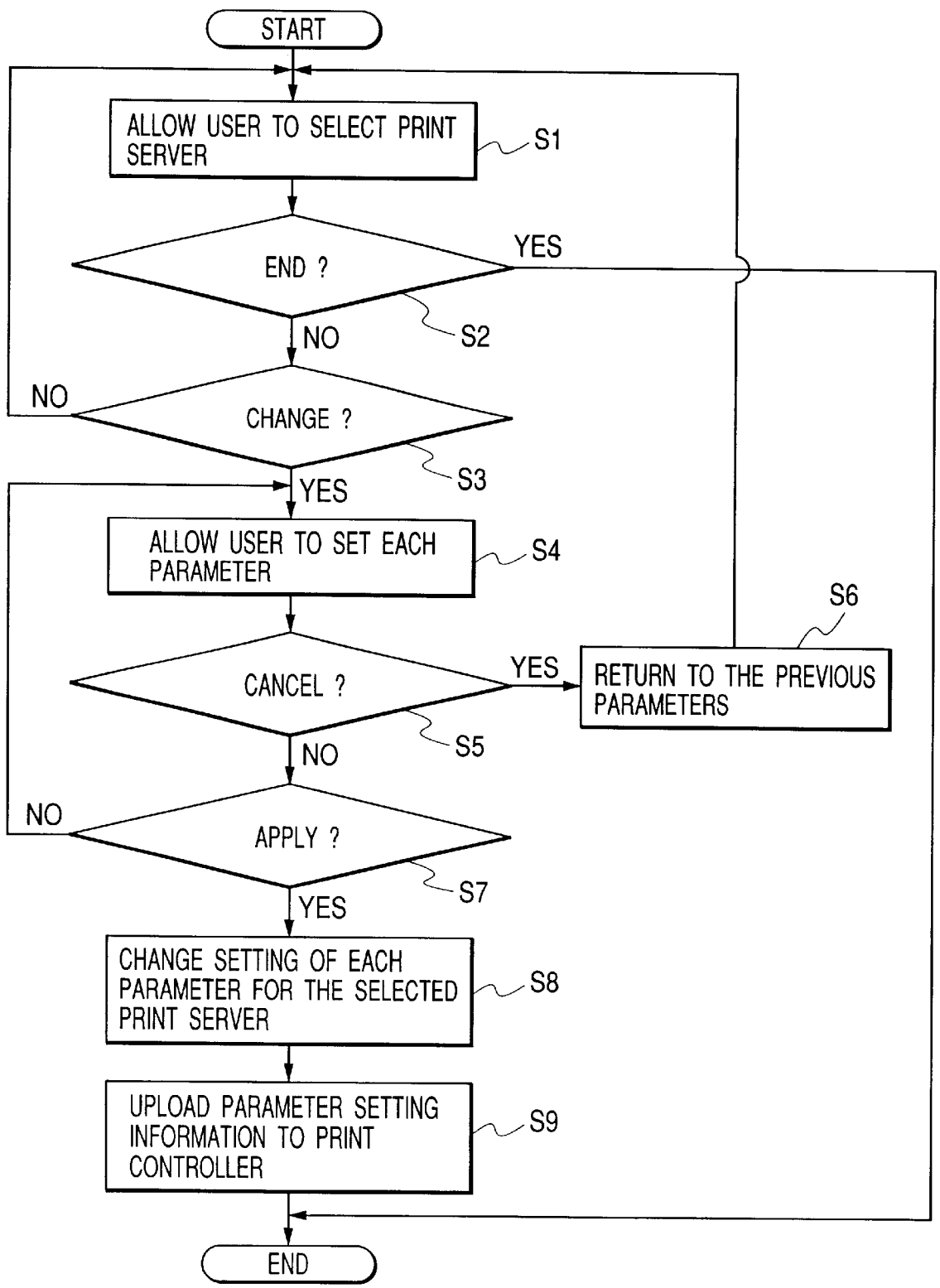
FIG. 28 is a flowchart which shows the setup process of parameters for a print server.

A reference numeral 4010 designates a removable disc drive (FDD) such as a floppy disc that functions as external storage means, which is used for reading out from the medium of the control programs (FIG. 27 and FIG. 28) which will be described later, as well as of the application program. The program represented by the process flow shown in FIG. 27 and FIG. 28 are stored on the floppy disc 4010, and also stored on the hard disc. Then, the system herein may become executable.

A reference numeral 4000 designates I/O buses (address bus, data bus, and control bus) that connect each of units described above.

<The Example of User Interface Screen>

Now, the description will be made of the user interface screen for use of the print server selection processes with the document editing application of the client 101, which is applicable to the present embodiment described above.

FIG. 23 is a view which shows the example of the user interface screen displayed on the CRT 4006 when the printing process is executed by means of the document editing application of the client 101, which is applicable to the present embodiment described above.

The screen display described here is possible not only at the time of the printing process execution, but also, at the time of the setup process execution for printing.

In FIG. 23, a reference numeral designates the dialogue panel which is displayed at the outset.

On the panel 2301, there are items that enable the designation of the print server at the output destination.

A reference numeral 2302 designates the toggle switch used for the direct designation of the print server, the toggle switch used for means for designating the print server in accordance with the order of priority described in the first and second embodiments hereof. The toggle switches 2301 and 2303 are arranged contrary in such a manner that either one of them is always in the selective status. If one of them which is in the non-selective status should be selected, the other one of them which is in the selective status is switched over to the non-selective status.

A reference numeral 2304 designates the "execute"button. When this button is selected, the process executable by either of the switches 2302 and 2303, which is in the selective status, is carried out.

A reference numeral 2305 designate "cancel" button. When this button is selected, the panel 2301 is closed to cancel the printing process or the printing setup process. The status of the panel returns to the display before the processing status.

In this respect, the toggle switches 2302 and 2303, and the buttons 2304 and 2305 can be selected by means of the external input device 4008, such as the keyboard or the pointing device.

Figure 24:
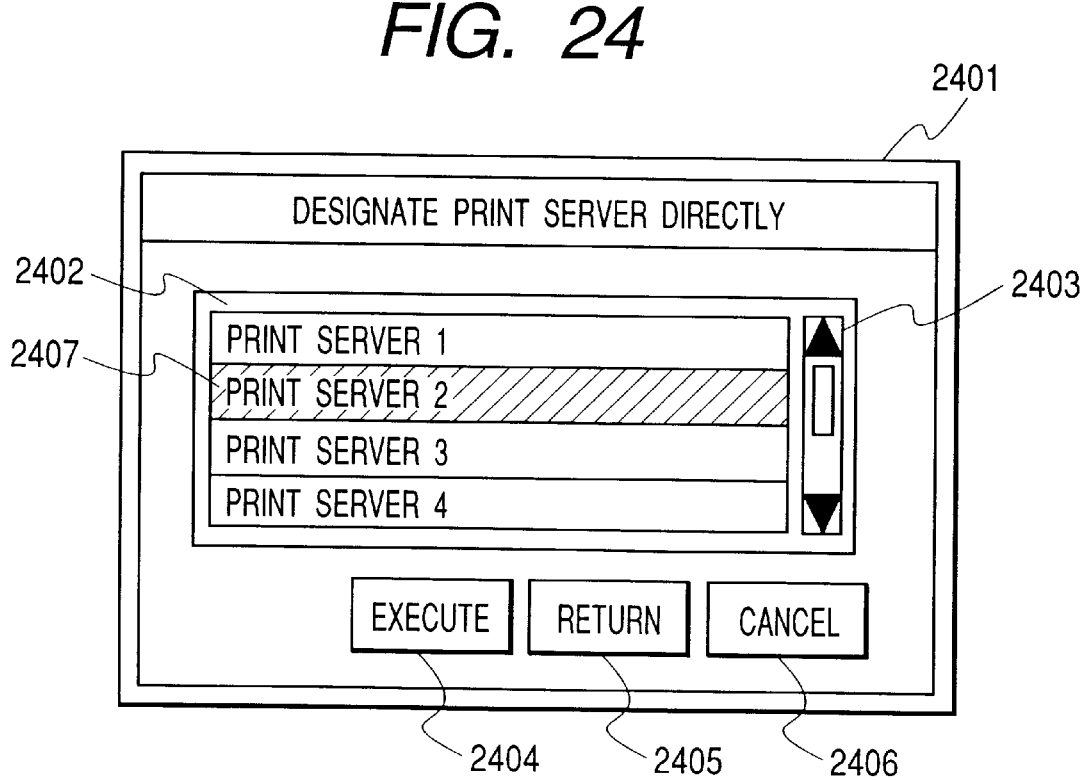
FIG. 24 is a view which shows one example of the user interface screen that displays the print server at the destination of print output on the client side.

FIG. 24 is a view which shows the example of user interface screen which is displayed when the print server is directly designated. In FIG. 23, when the user selects the "execute" button after having selected the toggle switch 2302, the process represented in FIG. 24 is executed.

In FIG. 24, a reference numeral 2401 designates the dialogue panel used for the direct designation of the print server, which enables the selection of the print server at the output destination.

A reference numeral 2402 designates the list box that enables the selection of the print server at the output destination. The names of the selective print servers are listed on this box. Any one of the print servers is made selective.

A reference numeral 2403 designates the scroll bar that is arranged for the list box 2402. If all the selective print servers cannot be displayed on the screen, this scroll bar is interlocked with the list box 2402 to scroll and represent all the listed servers on the screen.

A reference numeral 3404 designates the "execute" button. When this button is selected, the panels 2401 and 2301 are closed, and the print server currently selected on the list box 2402 is selected as the one for which printing is requested by the document editing application of the client 101. Here, if the current process is for the execution of printing, the output process to the print server, which is designated for printing, is executed in continuation. As described for the first and second embodiments hereof, this output means the processes to produce the print order and print script by use of the document editing application, and to transmit them the print controller 103.

In this respect, if the print server which has been selected is not present in the list box 2402 (that is, the case of the selection yet to be made), it is assumed that the "execute" button is in the non-selective status.

A reference numeral 2405 designates "return" button. When this button is selected, the panel 2401 is closed. Then, the panel 2301 shown in FIG. 23 is displayed on the screen. Thus, the status returns to the one before the panel 2401 is open.

A reference numeral 2406 designated the "cancel" button. When this button is selected, the panels 2401 and 2301 are closed. the processes of printing request or of printing setup are completely canceled.

Here, it is possible to operate the selection of the list box 2402, the scroll bar 2403, and buttons 2404, 2405, and 2406 through the external input device 4008 such as the keyboard or the pointing device.

In FIG. 24, the item 2407 that indicates "print server 2" is made selective on the list box 2402. If the "execute" button 2404 is selected in this status, it becomes possible to designate the "print server 2" are the print server at the output destination.

Figure 25:
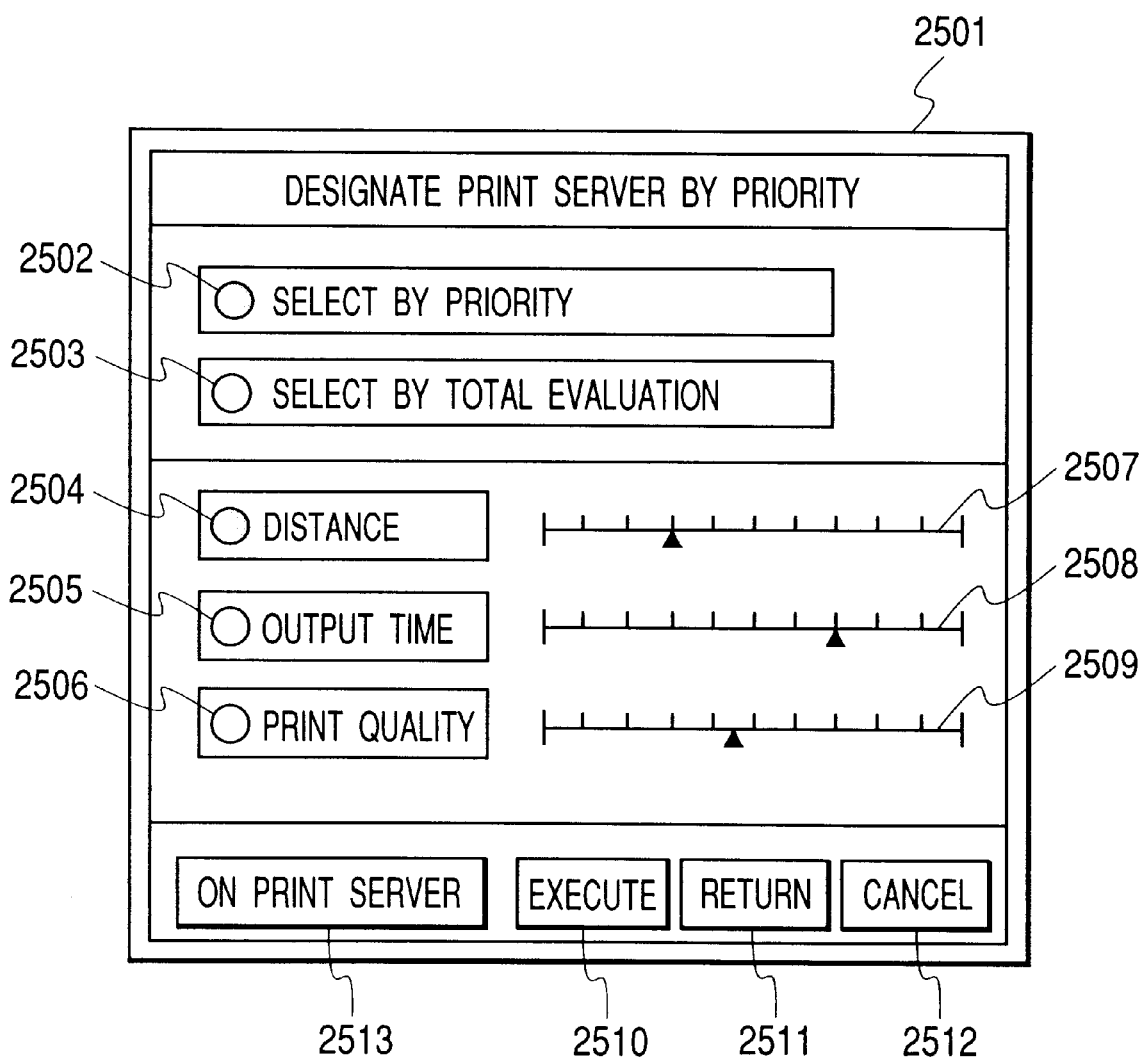
FIG. 25 is a view which shows one example of the user interface screen that displays the conditions under which the client selects the print server at the destination of print output.

FIG. 25 is a view which shows the example of the user interface screen which is displayed when the print server is selected in accordance with its order of priority. In FIG. 23, when the "execute" button is selected after having selected the toggle switch 2303, the processes are executed as shown in FIG. 25.

In FIG. 25, a reference numeral 2501 designates the dialogue panel used for designating the print server at the destination by the order of priority, which makes it possible to set up means for priority selection.

A reference numeral 2502 designates the toggle switch used for designating the print server by means of the single parameter of the priority order, and 2503, the toggle switch arranged for indicating the use of designation means by means of the comprehensive evaluation of the priority order of the parameters with which to write the print server. The toggle switches 2502 and 2503 are arranged contrary in such a manner that either one of them is always in the selective status. If the one which is in the non-selective status should be selected, the other one which is in the selective status is switched over to the non-selective status.

A reference numeral 2504 designates the toggle switch that designates "distance" as the parameter to determine the priority order; 2505, the toggle switch for "output time"; 2506, the one for "print quality". The toggle switches 2504, 2505, and 2506 are arranged contrary in such a manner that either one of them is always in the selective status. If the one which is in the non-selective status should be selected, the other one which is in the selective status is switched over to the non-selective status. In this respect, the set up of the toggle switches 2504, 2505, and 2506 is possible only when the toggle switch 2502 that indicates "the selection of the priority order" is in the selective status.

Reference numerals 2507, 2508, and 2509 designate the sliders to designate the priority order of parameters "distance", "output time", and "print quality", respectively. When each position of the knobs shifts, the respective priority orders of the parameters can be designated. Each value set by each of these sliders is transmitted to the print controller 103 after having been stored at 405, 407, and 409 as the orders of priorities to be recorded on the print order shown in FIG. 7, and then, used for determining the print server in the print controller 103. In this respect, the set up of the sliders 2507, 2508, and 2509 is possible only when the toggle switch 2503 that indicates "the selection by the comprehensive evaluation" is in the selective status.

A reference numeral 2510 designates the "execute" button. When this button is selected, the panels 2501 and 2301 are closed, and the processes designated by either one of the toggle switches 2502 and 2503 are executed. At this juncture, if the toggle switch 4202 is selected, the selective status of the toggle switches 2504, 2505, and 2506 is reflected on the process, and if the toggle switch 2503 is selected, the set up status of the sliders 2507, 2508, and 2509 is reflected on the process, respectively.

A reference numeral 2511 designates the "return" button. When this button is selected, the panel 2501 is closed, and the panel 2301 shown in FIG. 23 is displayed. Thus, the status returns to the status before the display of the panel 2501.

A reference numeral 2512 designates the "cancel" button. When this button is selected, the panels 2501 and 2301 are closed to make it possible to cancel the processes of the printing request or printing set up completely.

A reference numeral 2513 designates the "on print server" button. When this button is selected, it becomes possible to execute the processes required for setting up the detailed items of the print server which will be described later.

In this respect, it is possible to select the toggle switches 2502, 2503, 2504, 2505, or 2506, and sliders 2507, 2508, or 2509, and buttons 2510, 2511, 2512, or 2513 by use of the external input device 4008 such as the keyboard or printing device.

Also, in FIG. 25, the parameters "distance", "output time", and "print quality" are exemplified as those used for determining the priority order, but other parameters may be used for the same purpose.

Figure 26:
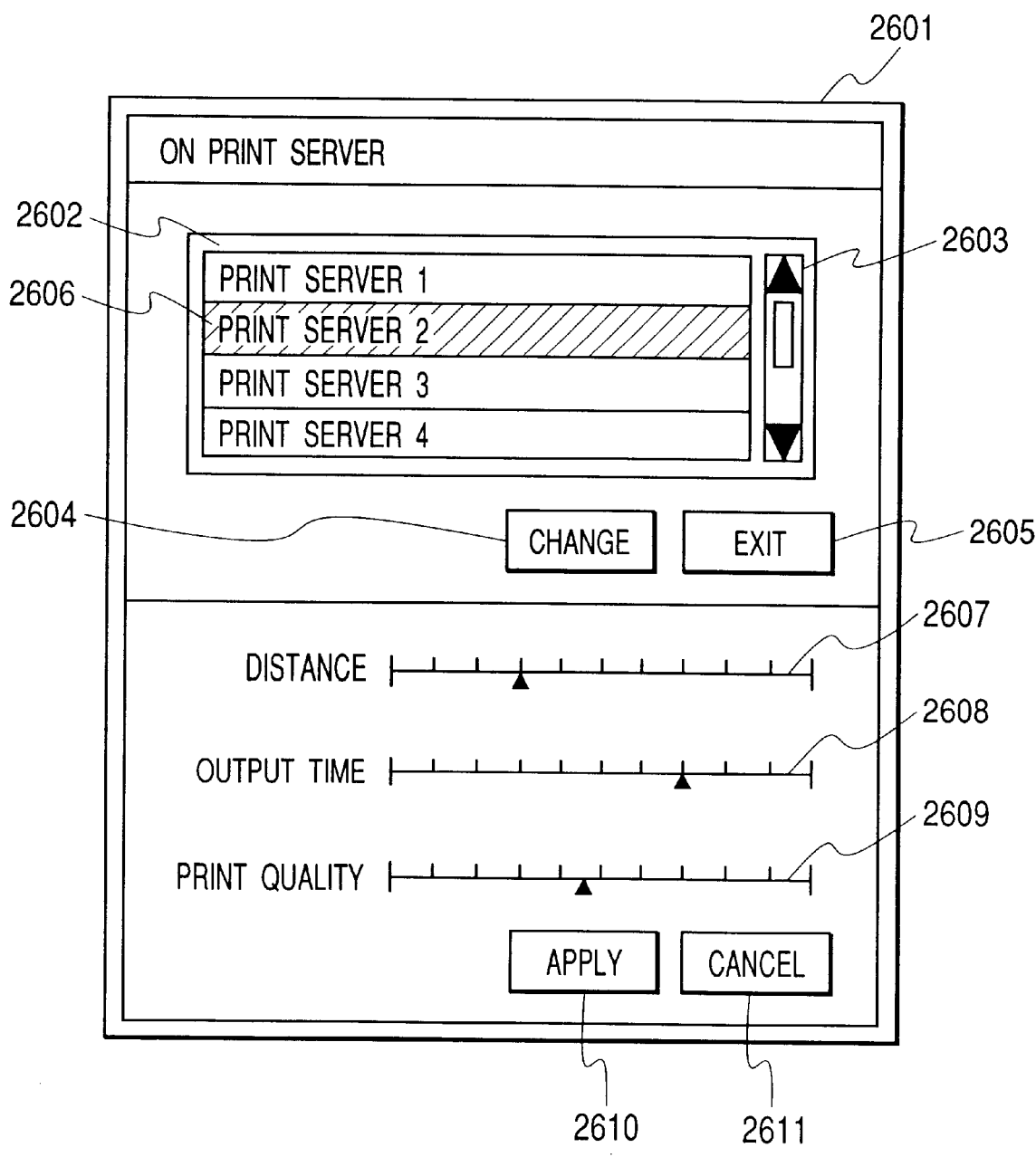
FIG. 26 is a view which shows one example of the user interface screen that displays the details of a print server designated by the client.

FIG. 26 is a view which shows the example of the user interface screen which is displayed when setting up the details of the print server. In FIG. 25, when the button 2513 is selected, the processes represented in FIG. 26 are executed.

In FIG. 26, a reference numeral 2601 designates the dialogue panel that enables the set up of the details of all the print servers that can execute output, which makes it possible to set up the order of priorities of each of the parameters of the respective print servers.

A reference numeral 2602 designates the list box for selecting the print server, which is used for setting up the details. The names of each print server that can be selected are listed on the box. Each of the print servers are made selective.

A reference numeral 2603 designates the scroll bar used for the list box 2602. If all the print servers that can be selected cannot be shown, the scroll bar is interlocked with the list box 2602 so that the representations on the list can be scrolled.

A reference numeral 2604 designates the "change" button. When this button is selected, the details of the priority order of the print server selected on the list box can be selected as target. If any print server that has been selected is not present on the list box 2602 (that is, the case of the selection yet to be made), the "change" button is in the non-selective status.

A reference numeral 2605 designates the "end" button. When this button is selected, the panel 2601 is closed. The display returns to the panel 2501 shown in FIG. 25, hence making it possible to continue the processes from the status before the panel 2601 is open.

The list box 2602 in FIG. 26 makes the item 2604 selective for the "print server 2". If the "change" button 2604 is selected in this status, the details of the priority order for the "print server 2" can be modified.

Reference numerals 2607, 2608, and 2609 designate the sliders that specify the priority order of each parameters of "distance", "output time", and "print quality". Shifting the positions of each knob makes it possible to designate the orders of priorities of the respective parameters. By means of these sliders, the set up values are registered as orders of priorities to be recorded on the print server management table (see FIG. 8), which are controlled within the print controller 103, and used for determining the print server in the print controller.

A reference numeral 2610 designates the "apply" button. When this button is selected, the client computer 101 transmits the set up details of the sliders 2607, 2608, and 2609 to the print controller 103 though the net work interface 4004. Thereafter, each of the set values is reflected on the orders of priorities of each of the parameters of the print server selected on the list box 2602. In other words, the print server management table (see FIG. 8), which is controlled by the print controller 103, is updated in the method described earlier, and used for selecting the print server at the destination of printing request written on the print order, which has been received from the client 101.

A reference numeral 2611 designates the "cancel" button. When this button is selected, the operation of the sliders 2607, 2608, and 2609 are canceled.

In this respect, after the selection of the "apply" button 2610 or the "cancel" button 2611, the operation of the slider 2607, 2608, and 2609 is disabled, and the current process returns to the operation of the list box 2602.

Also, the set up by means of the sliders 2607, 2608, and 2609, and the buttons 2610 and 2611 is possible only when the "change" button is selected. After the "change" button is selected, the operation of the list box 2610 and the "change" button becomes disabled until when the "apply" button 2610 or the "cancel" button 2611 is selected.

Also, the "end" button 2605 is made selective under any circumstances.

In this respect, the list box 2602, the scroll bar 2603, the sliders 2607, 2608, and 2609, and the buttons 2604, 2605, 2610, and 2611 can be selected for operation by the external input device such as the keyboard or pointing device.

Also, in FIG. 26, the parameters "distance", "output time", and "print quality" are exemplified as those determine the orders of priorities, but the other parameters may be used for the same purpose.

Here, in accordance with the present embodiment, the description has been made of the panel 2601 as the sub-panel of the panel 2501. However, it may be possible to use the function of the panel 2601 for the purpose of controlling the priority order of each of the print servers to be controlled by the print controller 103 as the function of a single application program that controls the print server of the print controller 103.

<The processes of the Client Computer>

FIG. 27 is a flowchart which illustrates the selection process of the output designations by the client computer in accordance with the present invention.

This process is executed when the document editing application loaded on the client computer 101 edits the image data of lower resolution received from the image server 102 for the creation of the print script described in conjunction with FIG. 3, and the printing request is transmitted.

When the process begins, the print server designation screen is displayed on the CRT as shown in FIG. 23. On the screen, the user designates the print server directly or designates the print server in accordance with the order of priority. When the selection is made to designate the print server directly, that is, if the toggle switch 2302 is selected, the process proceeds to S2. Otherwise, that is, if the toggle switch 2303 is selected, the process proceeds to S3.

In the S2, the client 101 displays the screen on the CRT 4006 as described in conjunction with FIG. 24. On this screen, the user selects the print server that outputs prints. When the print server is selected, the process proceeds to S6.

In the S3, the client 101 displays the screen on the CRT 4006 as described in conjunction with FIG. 25. On this screen, the user selects either the "selection by the priority order" or the "selection by the comprehensive evaluation" in the print controller 103. If the selection by the priority order is selected, the process proceeds to S4. If the selection by the comprehensive evaluation is selected, the process proceeds to S5.

In the S4, the user selects and determines the preferred destination of printing output by giving priority to either one of the parameters of "distance", "output time", and the "print quality" as shown in FIG. 25. This selection process is executed by the CPU 4001 that determines which one of the toggle switches 1504 to 2506 should be selected. When the preferred parameter is selected, the process proceeds to S6.

In the S5, the user determines all the parameters of "distance", "output time", and "print quality" by moving the slider bars 2507 to 2509 as shown in FIG. 25. When all the parameters are determined, the process proceeds to S6.

In the S6, the client computer 101 produces the print order as described in conjunction with FIG. 7, and transmits it to the print controller 103 through internet.

FIG. 28 is a flowchart that illustrates the selection process of the output destination by the client computer in accordance with the present invention.

The processes shown in FIG. 28 are executed when the button 2513 is selected on the user interface screen shown in FIG. 25.

In S1, the user selects from the list box 2602 the print server for which he intends to change the parameter whose details have been defined.

In S2, whether or not the "end" button 2605 has been depressed is determined. If affirmative, the process terminates. Here, this determination is made only in the S2 for the flowchart herein, but it is of course possible to determine the "end" process at any timing.

In S3, whether or not the "change" button shown in FIG. 26 is depressed is determined. If affirmative, the parameters of the print server selected on the list box 2602 are indicated on the slider bars 2607 to 2609. The process proceeds to the S4. If negative, the process returns to S1.

In S4, the user sets each of the parameters selected in the S1 by means of the slider bars 2607 to 2609. If the "cancel" button 2611 is depressed during the setting up of the parameters (S5), the slider bars 2607 to 2609 returns to the original parameters selected on the "on print server" screen shown in FIG. 26, and displayed again on the CRT 4006 (S6). Then, the process returns to the S1.

In S7, it is determined whether or not the "apply" button 2610 is depressed during the set up process of each parameter of the print server. If the "apply" button 2610 has been selected by the user through the external input device 4008, the process proceeds to S8. In the S8, modification takes place to set each of the parameters set in the S4 for the print server selected in the S1. The details of the print server controlled by the client computer 101 has been updated, the process proceeds to S9.

In the S9, the parameter set up updated for the print server in the S8 is registered on the print controller 103. To this end, the set up information of parameters are up loaded to the print controller 103. In other words, when the "apply" button 2610 is depressed, the client computer 101 is connected with the print controller through internet, and the set up information of parameters is transmitted accordingly. When the up loading to the print controller 103 is completed, the internet is disconnected to terminate the process.

Also, there is no necessity for the client computer 101 to perform the detailed set up of the print server described in conjunction with FIG. 28, as well as the up loading to the print controller. In other words, if only the print server is provided with the control program as shown in FIG. 28, the details needed for the print server are set up by the print server itself, and it also becomes possible to carry out the up loading to the print controller 103 accordingly.

Now, the description will be made of the execution mode of the client computer 101, which is one embodiment of the information processing apparatus structured characteristically in accordance with the present invention.

As described above, the information processing apparatus (client computer 101), which is capable of specifying an image printing as desired, is arranged to be provided with determination means (the function of the CPU 4001 by the application of the control program as in the S1 in FIG. 27) that determines the selection of whether any one of the print servers (104 to 106) is directly designated for controlling the image data output (S2 in FIG. 27) or the conditions required for selecting a print server is designated (S3 in FIG. 27); selection means for selecting the print server that controls the output of the image data when the selection is made to specify the print server directly by the determination means (the function of the CPU 4001 by the application of the control program as in the S2 shown in FIG. 27); condition defining means for setting up the conditions when the selection is made by the determination means (the function of CPU 4001 by the application of the control program as in the S3 to S5 in FIG. 27) to define the selecting conditions of the print server; and means for transmitting the printing request to the print controller by producing the print order (see FIG. 7) on the basis of the conditions defined by use of the print server selected by the selection means or by the selection condition defining means (the function of the CPU 4001 by the application of the control program as in the S6 in FIG. 27). In this manner, it becomes possible to provide the system that can determine the destination of printing output by user as he desires. Also, it is possible to provide the system that can reduce the loads to the information processing apparatus, as well as to the net work, by the provision of reception means (the network interface 4004) for receiving from the image server 102 the image data of lower resolutions for editing use (at 301 in FIG. 3); and also, by the provision of the editing means (the function of the document editing application stored in the ROM 4003) that creates editing information (at 306 in FIG. 3) which indicates the contents thereof by editing the image data received from the reception means. In this manner, the printing request means is characterized in that the editing information produced by the editing means (at 306 in FIG. 3) and the print order (FIG. 7) are transmitted to the print controller together, and that the load is reduced when it is given to the net work through which the image data of lower resolutions are received. Here, also, the editing information is transmitted at the time of transmitting the printing request. Therefore, it becomes unnecessary to transmit to the information processing apparatus the image data of higher resolutions that may be used for actual printing.

Also, the image data received from the image server are transmitted in the form of image tiles which are divided into the smaller units (FIG. 2) stored in advance on the image server. As a result, the tiles can be transmitted as required, hence making it possible to provide the system that can reduce the load given to the net work.

Also, the editing information is provided with the ID information (at 306 in FIG. 3) that identifies the image data required for editing. With the editing information thus transmitted, it is possible to provide the system that enables the external device to recognize the image data of higher resolutions which are needed for the actual printing.

Also, the editing information is characterized in that it is written in the script form (at 306 in FIG. 3). Therefore, it is made possible to provide the system that enables the device, which should analyze the editing information, to deal with the data easily.

Also, with the conditions prepared to contain at least either one of the distance (2504) from the information processing apparatus, the time (2506) required for completing the print output depending on the loading status of the print server that executes the print output, and the print quality (2506) such as the resolutions required for the output image, it is made possible to provide the system that enables the user to determine the priority order in detail as he desires.

Also, there are further provided the print server defining means that sets up the parameters corresponding to the conditions of the print server (the function of the CPU 4001 by the application of the control program as in the S1, S4, and S8 in FIG. 28); and registration means (the function of the CPU by the application of the control program as in the S9 in FIG. 28) that registers the print server parameters, which are defined by the print server defining means, on the print server management table (FIG. 8) stored on the print controller 103. With such further provision of these means, it is made possible to provide the system that enables the user to set the details of the print server himself.

Here, the print controller also determines the print server at the destination of the print order for printing output on the basis of the parameters registered by the registration means on the print server management table. Therefore, it is made possible to provide the system that enables the user to request printing by means of the print server as he desires at the output destination.

Also, it is arranged that the editing deals with the mosaic process, gradations, color changes, gradation changes or deals with the addition of data such as template, stamps, illustrations, hence making it possible to execute various editing processes for image preparation. Further, since there is no need for changing images directly for the performance of such editing process, the information processing apparatus is not required to use the image data of higher resolutions such as needed for the actual printing. In this way, it becomes possible to provide the system that makes the loads smaller both for the information processing apparatus and the net work.

Also, the print controller and the image server are connected with each other using the internet service, thus providing the system that enables the user to issue his printing request through the internet.

As described above, the present invention makes it possible to select among the output apparatuses provided for the system that uses plural print servers the optimum one that may satisfy the conditions, such as economy, time, and distance, by the provision of the print controller in the system that integrates such apparatuses, as well as by the use of means for transmitting only the image information of an image through the different transmitting channel.

Also, the arrangement is made so that the client receives the image data of lower resolutions, thus making it possible to reduce the load given to the net work, and that the client can transmit the editing information when printing is requested. There is no need for the image processing apparatus to transmit the image data of higher resolutions that should be used for actual printing, which also makes it possible to reduce the loads given to the information processing apparatus, and the net work as well.

Also, the client can execute various editing processes with respect to images. Further, it is unnecessary for such editing processes to change the images directly. Therefore, the client is not required to use the image data of higher resolutions which are needed for the actual printing. In this manner, it is possible to provide the system that effectively reduces the loads exerted both on the client computer and the network.

What is claimed is:

1. A printing control system for providing an online print service via an Internet, comprising:

a plurality of print servers for controlling a highly precise output of image data by utilization of the image data accumulated on an image server for accumulating image data; and a print controller for receiving a print order from a client via the Internet and, when the received print order does not includes instruction information on print server selection, designating one of said plurality of print servers for executing a print process of image data accumulated on the image server by checking that an execution condition of said one print server is satisfied, the execution condition including a plurality of parameters different from the instruction information.

2. A printing control system according to claim 1, wherein said image data are transmitted after being divided into image tiles of small units recorded in advance on said image server.

3. A printing control system according to claim 1, wherein said image data are divided into image tiles of small units recorded in advance on said image server, and the ID information identifying them is transmitted.

4. A printing control system according to claim 3, wherein said client transmits to said print controller the information represented in the page description language containing said ID information.

5. A printing control system according to claim 1, wherein said image data are divided into image tiles of small units represented in plural kinds of resolutions, and recorded in said image server, respectively.

6. A printing control system according to claim 5, wherein said printing control system further comprises the client for designating desired image printing, and said client receives from said image server the image tiles of small units represented in plural kinds of resolutions recorded in advance on said image server.

7. A printing control system according to claim 1, wherein said print controller comprises:

means for designating print server for specifying the image output to an appropriate print server; and means for transmitting page description language to transmit the information written in the page description language to the print server designated by said print server designating means.

8. A printing control system according to claim 7, wherein said print server comprises:

image synthesizing means for synthesizing the output images again on the basis of the page description language transmitted from said print controller, and of the image tiles divided into small units and transmitted from said image server; and image output means for outputting the images synthesized by said image synthesizing means.

9. A printing control system according to claim 1, wherein when selecting said print server, said print controller is provided with the function of output apparatus (printer) having the adaptability with respect to the distance from the client requesting the output or the time required for completing the output depending on the load condition of the print server executing the output or the resolutions needed for the output images and other image quality or meeting the contents of output images, or provided with print server designating means for determining an appropriate print server in accordance with various conditions including the intention of said client requesting the output.

10. A printing control system according to claim 9, wherein the appropriate print server is automatically selected with the provision of the priority order with respect to said various conditions.

11. A printing control system for providing an online print service via an Internet, comprising:

an image server for accumulating image data; and a print controller for receiving a print order from a client via the Internet and, when the received print order does not include instruction information on print server selection, designating one of a plurality of print servers for executing a print process of image data accumulated on said image server by checking that an execution condition of the one print server is satisfied, the execution condition including a plurality of parameters different from the instruction information.

12. A printing control system according to claim 11, wherein said image data are transmitted after being divided into image tiles of small units recorded in advance on said image server.

13. A printing control system according to claim 11, wherein said image data are divided into image tiles of small units recorded in advance on said image server, and the ID information identifying them is transmitted.

14. A printing control system according to claim 13, wherein said client transmits to said print controller the information represented in the page description language containing said ID information.

15. A printing control system according to claim 11, wherein said image data are divided into image tiles of small units represented in plural kinds of resolutions, and recorded in said image server, respectively.

16. A printing control system according to claim 15, wherein said printing control system further comprises the client for designating desired image printing, and
said client receives from said image server the image tiles of small units represented in plural kinds of resolutions recorded in advance on said image server.

17. A printing control system according to claim 11, wherein said print controller comprises:
means for designating print server for specifying the image output to an appropriate print server; and
means for transmitting page description language to transmit the information written in the page description language to the print server designated by said print server designating means.

18. A printing control system according to claim 17, wherein said print server comprises:
image synthesizing means for synthesizing the output images again on the basis of the page description language transmitted from said print controller, and of the image tiles divided into small units and transmitted from said image server;
and image output means for outputting the images synthesized by said image synthesizing means.

19. A printing control system according to claim 11, wherein when selecting said print server, said print controller is provided with the function of output apparatus (printer) having the adaptability with respect to the distance from the client requesting the output or the time required for completing the output depending on the load condition of the print server executing the output or the resolutions needed for the output images and other image quality or meeting the contents of output images, or provided with print server designating means for determining an appropriate print server in accordance with various conditions including the intention of said client requesting the output.

20. A printing control system according to claim 19, wherein the appropriate print server is automatically selected with the provision of the priority order with respect to said various conditions.

21. A print controller for providing an online print service via an Internet, comprising:
reception means for receiving a print order from a client via the Internet;
selection means for selecting a print server for executing a print process among a plurality of print servers so as to transmit the print order received by said reception means with image data accumulated on an image server for accumulating image data; and
selection controlling means for, when the print order received by said reception means does not include instruction information on print server selection, controlling said selection means to select the print server for executing the print process by checking that an execution condition of the print server is satisfied, the execution condition including a plurality of parameters different from the instruction information.

22. A print controller according to claim 21, wherein said image data are transmitted after being divided into the image tiles of small units recorded in advance on said image server.

23. A print controller according to claim 21, wherein said image data are divided into the image tiles of small unit recorded in advance on said image server, and the ID information identifying them is transmitted.

24. A print controller according to claim 21, wherein said image data is divided into the image tiles of small unit represented by plural kinds of resolutions and stored in said image server, respectively.

25. A print controller according to claim 21, wherein said print controller comprises means for transmitting page description language to transmit the information written in the page description language to the print server designated by print server designating means.

26. A print controller according to claim 25, wherein said print server comprises:
image synthesizing means for synthesizing the output images again on the basis of the page description language transmitted from said print controller, and of the image tiles divided into small units and transmitted from said image server; and
image output means for outputting the images synthesized by said image synthesizing means.

27. A print controller according to claim 21, wherein when selecting said print server, said print controller is provided with the function of output apparatus (printer) having the adaptability with respect to the distance from the client requesting the output or the time required for completing the output depending on the load condition of the print server executing the output or the resolutions needed for the output images and other image quality or meeting the contents of output images, or provided with print server designating means for determining an appropriate print server in accordance with various conditions including the intention of said client requesting the output.

28. A print controller according to claim 27, wherein the appropriate print server is automatically selected with the provision of the priority order with respect to said various conditions.

29. A print controller according to claim 21, wherein said client transmits to said print controller the information represented in the page description language containing said ID information.

30. A print controller according to claim 21, wherein said client receives from said image server the image tiles of small units represented in plural kinds of resolutions recorded in advance on said image server.

31. A method of controlling the print controller which provides an online print service via an Internet, comprising:
a reception step of receiving a print order from a client via the Internet;
a selection step of selecting a print server for executing a print process among a plurality of print servers so as to transmit the received print order with image data accumulated on an image server for accumulating image data; and a selection controlling step of, when the received print order does not include instruction information on print server selection, controlling said selection step to select the print server for executing the print process by checking that an execution condition of the print server is satisfied, the execution condition including a plurality of parameters different from the instruction information.

32. A controlling method according to claim 31, wherein said image data are transmitted after being divided into the image tiles of small units recorded in advance on said image server.

33. A controlling method according to claim 31, wherein said image data are divided into the image tiles of small unit recorded in advance on said image server, and the ID information identifying them is transmitted.

34. A print controlling method according to claim 33, further comprising: the function of receiving information written in the page description language containing said ID information.

35. A controlling method according to claim 31, wherein said image data is divided into the image tiles of small unit represented by plural kinds of resolutions and stored in said image server, respectively.

36. A controlling method according to claim 31, wherein said controlling method is provided further with the function of transmitting page description language to transmit the information written in the page description language to the print server designated by print server designating means.

37. A controlling method according to claim 31, wherein said print server comprises:

image synthesizing means for synthesizing the output images again on the basis of the page description language transmitted from said print controller, and of the image tiles divided into small units and transmitted from said image server; and image output means for outputting the images synthesized by said image synthesizing means.

38. A print controller according to claim 31, wherein when selecting said print server, said print controller is provided with the function of output apparatus (printer) having the adaptability with respect to the distance from the client requesting the output or the time required for completing the output depending on the load condition of the print server executing the output or the resolutions needed for the output images and other image quality or meeting the contents of output images, or provided with print server designating means for determining an appropriate print server in accordance with various conditions including the intention of said client requesting the output.

39. A controlling method according to claim 38, wherein the appropriate print server is automatically selected with the provision of the priority order with respect to said various conditions.

40. A controlling method according to claim 31, wherein said print controlling is executed by the print controller.

41. A storage medium having recorded thereon codes for implementing a computer implementable method of providing an online print service via an Internet, comprising:

a reception step of receiving a print order from a client via the Internet;

a selection step of selecting a print server for executing a print process among a plurality of print servers so as to transmit the received print order with image data accumulated on an image server for accumulating image data; and a selection controlling step of, when the received print order does not include instruction information on print server selection, controlling said selection step to select the print server for executing the print process by checking that an execution condition of the print server is satisfied, the execution condition including a plurality of parameters different from the instruction information.

42. A storage medium according to claim 41, wherein said image data are transmitted after being divided into the image tiles of small units recorded in advance on said image server.

43. A storage medium according to claim 41, wherein said image data are divided into the image tiles of small unit recorded in advance on said image server, and the ID information identifying them is transmitted.

44. A storage medium according to claim 43, further comprising; the function for receiving the information written in the page description language containing said ID information.

45. A storage medium according to claim 41, wherein said image data is divided into the image tiles of small unit represented by plural kinds of resolutions and stored in said image server, respectively.

46. A storage medium according to claim 41, wherein said storage medium comprises means for transmitting page description language to transmit the information written in the page description language to the print server designated by print server designating means.

47. A storage medium according to claim 46, wherein said print server comprises:

image synthesizing means for synthesizing the output images again on the basis of the page description language transmitted from said print controller, and of the image tiles divided into small units and transmitted from said image server; and image output means for outputting the images synthesized by said image synthesizing means.

48. A storage medium according to claim 41, wherein when selecting said print server, said print controller is provided with the function of output apparatus (printer) having the adaptability with respect to the distance from the client requesting the output or the time required for completing the output depending on the load condition of the print server executing the output or the resolutions needed for the output images and other image quality or meeting the contents of output images, or provided with print server designating means for determining an appropriate print server in accordance with various conditions including the intention of said client requesting the output.

49. A storage medium according to claim 48, wherein the appropriate print server is automatically selected with the provision of the priority order with respect to said various conditions.

50. A storage medium according to claim 41, wherein said printing control is executed by the print controller.

51. A computer program for controlling a print controller which provides an online print service via an Internet, comprising:

program code for a reception step of receiving a print order from a client via the Internet;

program code for a selection step of selecting a print server for executing a print process among a plurality of print servers so as to transmit the received print order with image data accumulated on an image server for accumulating image data; and program code for a selection controlling step of, when the received print order does not include instruction information on print server selection, controlling said selection step to select the print server for executing the print process by checking that an execution condition of the print server is satisfied, the execution condition including a plurality of parameters different from the instruction information.

52. A program according to claim 51, wherein said image data are transmitted after being divided into the image tiles of small units recorded in advance on said image server.

53. A program according to claim 51, wherein said image data are divided into the image tiles of small unit recorded in advance on said image server, and the ID information identifying them is transmitted.

54. A program according to claim 53, further comprising: the function of receiving information written in the page description language containing said ID information.

55. A program according to claim 51, wherein said image data is divided into the image tiles of small unit represented by plural kinds of resolutions and stored in said image server, respectively.

56. A program according to claim 51, wherein said program is provided further with a function of transmitting page description language to transmit the information written in the page description language to the print server designated by program code for a print server designating step by a print server.

57. A program according to claim 51, wherein said print server comprises:

image synthesizing means for synthesizing the output images again on the basis of the page description language transmitted from said print controller, and of the image tiles divided into small units and transmitted from said image server; and;

image output means for outputting the images synthesized by said image synthesizing means.

58. A program according to claim 51, wherein when selecting said print server, said print controller is provided with a function of an output apparatus (printer) having adaptability with respect to a distance from the client requesting an output or a time required for completing the output depending on a load condition of the print server executing the output or resolutions needed for output images and other image quality or meeting contents of output images, or provided with print server designating means for determining an appropriate print server in accordance with various conditions including an intention of said client requesting the output.

59. A program according to claim 58, wherein the appropriate print server is automatically selected with the provision of the priority order with respect to said various conditions.

60. A program according to claim 51, wherein said print controlling is executed by the print controller.

61. A print controller for providing an online print service via an Internet, comprising:

a reception unit adapted for receiving a print order from a client via the Internet;

a selection unit adapted for selecting a print server for executing a print process among a plurality of print servers so as to transmit the print order received by said reception unit with image data accumulated on an image server for accumulating image data; and a selection controlling unit adapted for, when the print order received by said reception unit does not include instruction information on print server selection, controlling said selection unit to select the print server for executing the print process by checking that an execution condition of the print server is satisfied, the execution condition including a plurality of parameters different from the instruction information.

62. A print controller according to claim 61, wherein said image data are transmitted after being divided into the image tiles of small units recorded in advance on said image server.

63. A print controller according to claim 61, wherein said image data are divided into the image tiles of small unit recorded in advance on said image server, and the ID information identifying them is transmitted.

64. A print controller according to claim 61, wherein said image data is divided into the image tiles of small unit represented by plural kinds of resolutions and stored in said image server, respectively.

65. A print controller according to claim 61, wherein said print controller comprises a transmitter adapted for transmitting page description language to transmit the information written in the page description language to the print server designated by print server designating means.

66. A print controller according to claim 65, wherein said print server comprises:

an image synthesizing device adapted for synthesizing the output images again on a basis of the page description language transmitted from said print controller, and of the image tiles divided into small units and transmitted from said image server; and an image output device adapted for outputting the images synthesized by said image synthesizing device.

67. A print controller according to claim 61, wherein when selecting said print server, said print controller is provided with the function of an output apparatus (printer) having an adaptability with respect to a distance from the client requesting an output or a time required for completing the output depending on a load condition of the print server executing the output or resolutions needed for the output images and other image quality or meeting contents of output images, or provided with a print server designating device adapted for determining an appropriate print server in accordance with various conditions including an intention of said client requesting the output.

68. A print controller according to claim 67, wherein the appropriate print server is automatically selected with a provision of a priority order with respect to said various conditions.

69. A print controller according to claim 61, wherein said client transmits to said print controller information represented in the page description language containing said ID information.

70. A print controller according to claim 61, wherein said client receives from said image server the image tiles of small units represented in plural kinds of resolutions recorded in advance on said image server.

71. A print controller for providing an online print service via an Internet, comprising:

reception means for receiving a print order from a client via the Internet;

selection means for selecting a print server for executing a print process, from among a plurality of print servers, so as to transmit the print order received by said reception means with image data which is not received with the print order from the client; and selection controlling means for, when the print order received by said reception means does not include instruction information on print server selection, controlling said selection means to select the print server for executing the print process by checking that an execution condition of the print server is satisfied, the execution condition including at least one parameter different from the instruction information.

72. A print controller according to claim 71, further comprising transmission means for transmitting information written in a page description language to the print server selected by said selection means.

73. A print controller according to claim 72, wherein the print server comprises:

image synthesizing means for again synthesizing output images to be output on a basis of the page description language transmitted by said transmission means, and of image tiles divided into small units; and image output means for outputting the images synthesized by said image synthesizing means.

74. A print controller according to claim 71, wherein said selection means selects the print server in accordance with the execution condition including at least one of (a) a distance from the client, (b) a time required for completing the output depending on a load condition of the print server, (c) an adaptability for image quality including resolutions needed for the output images, (d) the function of an output apparatus (printer) corresponding to contents of the output images, and (e) an intention of the client requesting the output.

75. A print controller according to claim 74, wherein said selection means automatically selects the appropriate print server with a provision of a priority order with respect to the execution condition.

76. A method of controlling a print controller which provides an online print service via an Internet, comprising:

a reception step, of receiving a print order from a client via the Internet;

a selection step, of selecting a print server for executing a print process, from among a plurality of print servers, so as to transmit the print order received in said reception step with image data which is not received with the print order from the client; and a selection controlling step, of, when the print order received in said reception step does not include instruction information on print server selection, controlling execution of said selection step so as to select the print server for executing the print process by checking that an execution condition of the print server is satisfied, the execution condition including at least one parameter different from the instruction information.

77. A controlling method according to claim 74, further comprising a transmission step, of transmitting information written in a page description language to the print server selected in said selection step.

78. A controlling method according to claim 77, wherein the print server comprises:

image synthesizing means for again synthesizing output images to be output on a basis of the page description language transmitted in said transmission step, and of image tiles divided into small units; and image output means for outputting the images synthesized by said image synthesizing means.

79. A controlling method according to claim 76, wherein said selection step includes selecting the print server in accordance with the execution condition including at least one of (a) a distance from the client, (b) a time required for completing the output depending on a load condition of the print server, (c) an adaptability for image quality including resolutions needed for the output images, (d) the function of an output apparatus (printer) corresponding to contents of the output images, and (e) an intention of the client requesting the output.

80. A controlling method according to claim 79, wherein said selection step includes automatically selecting the appropriate print server with a provision of a priority order with respect to the execution condition.

81. A computer program for controlling a print controller which provides an online print service via an Internet, comprising:

program code for a reception step, of receiving a print order from a client via the Internet;

program code for a selection step, of selecting a print server for executing a print process, from among a plurality of print servers, so as to transmit the print order received in said reception step with image data which is not received with the print order from the client; and program code for a selection controlling step, of, when the print order received in said reception step does not include instruction information on print server selection, controlling execution of said selection step so as to select the print server for executing the print process by checking that an execution condition of the print server is satisfied, the execution condition including at least one parameter different from the instruction information.

82. A computer program according to claim 81, further comprising program code for a transmission step, of transmitting information written in a page description language to the print server selected in said selection step.

83. A computer program according to claim 82, wherein the print server comprises:

image synthesizing means for again synthesizing output images to be output on a basis of the page description language transmitted in said transmission step, and of image tiles divided into small units; and image output means for outputting the images synthesized by said image synthesizing means.

84. A computer program according to claim 81, wherein said selection step includes selecting the print server in accordance with the execution condition including at least one of (a) a distance from the client, (b) a time required for completing the output depending on a load condition of the print server, (c) an adaptability for image quality including resolutions needed for the output images, (d) the function of an output apparatus (printer) corresponding to contents of the output images, and (e) an intention of the client requesting the output.

85. A computer program according to claim 84, wherein said selection step includes automatically selecting the appropriate print server with a provision of a priority order with respect to the execution condition.

86. A print controller for providing an online print service via an Internet, comprising:

a reception unit adapted to receive a print order from a client via the Internet;

a selection unit adapted to select a print server for executing a print process, for among a plurality of print servers, so as to transmit the print order received by said reception unit with image data which is not received with the print order from the client; and a selection controlling unit adapted to control, when the print order received by said reception unit does not include instruction information on print server selection, said selection unit to select the print server for executing the print process by checking that an execution condition of the print server is satisfied, the execution condition including at least one parameter different from the instruction information.

87. A print controller according to claim 86, further comprising a transmitter adapted to transmit information written in a page description language to the print server selected by said selection unit.

88. A print controller according to claim 87, wherein the print server comprises:

an image synthesizing device adapted again to synthesize output images to be output on a basis of the page description language transmitted by said transmitter, and of image tiles divided into small units; and an image output device adapted to output the images synthesized by said image synthesizing device.

89. A print controller according to claim 86, wherein said selection unit selects the print server in accordance with the execution condition including at least one of (a) a distance from the client, (b) a time required for completing the output depending on a load condition of the print server, (c) an adaptability for image quality including resolutions needed for the output images, (d) the function of an output apparatus (printer) corresponding to contents of the output images, and (e) an intention of the client requesting the output.

90. A print controller according to claim 89, wherein said selection unit automatically selects the appropriate print server with a provision of a priority order with respect to the execution condition.

* * * * *

UNITED STATES PATENT AND TRADEMARK OFFICE
CERTIFICATE OF CORRECTION

PATENT NO.    : 6,654,135 B2
DATED         : November 25, 2003
INVENTOR(S)   : Shigeyuki Mitani It is certified that error appears in the above-identified patent and that said Letters Patent is hereby corrected as shown below:

Title page,
Item [30], Foreign Application Priority Data, "Apr. 23, 1997 (JP) ………. 10-113258" should read -- Apr. 23, 1998 (JP) ………. 10-113258 --.

Column 1,
Line 48, "form the target" should read -- from the target --.

Column 6,
Line 27, "tile Ids" should read -- tile IDs --; and
Line 30, "and Ids" should read -- and IDs --.

Column 7,
Line 14, "fees are accordingly" should read -- fees accordingly --.
Line 24, "image file ID" should read -- image tile ID --;
Line 43, ""httb://image.canon.co.jp/public/flower_fpx"." should read -- "http://image.canon.co.jp/public/flower_fpx". --; and
Line 65, "information complied as" should read -- information compiled as --.

Column 9,
Line 64, "credit cart" should read -- credit card --.

Column 13,
Line 26, "serves" should read -- servers --; and
Line 50, "includes" should read -- include --.

Column 14,
Line 26, "The line.at" should read -- The line at --;
Line 45, "Q(M)=A(1)*P(M, 1)+A(1)*P(M, 1)+…+A(N)*P(M, N()formula 3)" should read -- Q(M) = A(1)*P(M, 1)+A(1)*P(M, 1)+…+A(N)*P(M, N)
　　　　　　　　　　　　　　　　　　　　　…(formula 3) --; and
Line 54, "disc)" should read -- disc). --.

UNITED STATES PATENT AND TRADEMARK OFFICE
CERTIFICATE OF CORRECTION

PATENT NO. : 6,654,135 B2
DATED : November 25, 2003
INVENTOR(S) : Shigeyuki Mitani It is certified that error appears in the above-identified patent and that said Letters Patent is hereby corrected as shown below:

Column 15,
Line 33, "select the" should read -- selects the --; and
Line 61-62, should be deleted.

Column 16,
Line 37, "that should" should read -- which should --.

Column 18,
Line 17, "means" should read -- mean --.

Column 19,
Line 18, "there any" should read -- there are any --; and
Line 28, "serves" should read -- servers --.

Column 20,
Line 46, "Q(M)=A(1)*P(M, 1)+A(1)*P(M, 1)+…+A(N)*P(M, N()formula 3)" should read -- Q(M) = A(1)*P(M, 1)+A(1)*P(M, 1)+…+A(N)*P(M, N)
$\qquad$ …(formula 3) --.

Column 23,
Line 36, "print" should read -- printer --;
Line 53, "patters" should read -- patterns --; and
Line 57, "switch" should read -- switches --.

Column 24,
Line 52, "know" should read -- a known --.

Column 27,
Line 54, "diagram" should read -- Diagram --.

Column 29,
Line 6, "designate "cancel"" should read -- designates the "cancel" --;
Line 45, "them the" should read -- them to the --;
Line 55, "designated" should read -- designates --;
Line 57, "closed. the" should read -- closed. The --; and
Line 66, "are" should read -- as --.

Column 32,
Line 2, "slider" should read -- sliders --;
Line 18, "those determine" should read -- those which determine --; and
Line 29, "processes" should read -- Processes --.

UNITED STATES PATENT AND TRADEMARK OFFICE
CERTIFICATE OF CORRECTION

PATENT NO.    : 6,654,135 B2
DATED         : November 25, 2003
INVENTOR(S)   : Shigeyuki Mitani It is certified that error appears in the above-identified patent and that said Letters Patent is hereby corrected as shown below:

Column 33,
Line 28, "returns" should read -- return --; and
Line 38, "has" should read -- have --.

Column 34,
Line 60, "(2506)" should read -- (2505) --.

Column 35,
Line 67, "includes" should read -- include --.

Column 37,
Line 44, "server;" should read -- server; and --; and
Line 45, "and" should be deleted.

Column 39,
Line 21, "comprising: the" should read -- comprising: ¶ the --.

Column 40,
Line 20, "comprising; the" should read -- comprising: ¶ the --.

Column 41,
Line 37, "and;" should read -- and --.

UNITED STATES PATENT AND TRADEMARK OFFICE
CERTIFICATE OF CORRECTION

PATENT NO. : 6,654,135 B2
DATED : November 25, 2003
INVENTOR(S) : Shigeyuki Mitani It is certified that error appears in the above-identified patent and that said Letters Patent is hereby corrected as shown below:

Column 43,
Line 38, "process, from" should read -- process from --.

Column 44,
Line 61, "for among" should read -- from among --.

Signed and Sealed this

Thirteenth Day of July, 2004

JON W. DUDAS
*Acting Director of the United States Patent and Trademark Office*